(12) United States Patent
Katou

(10) Patent No.: US 9,357,187 B2
(45) Date of Patent: *May 31, 2016

(54) PROJECTOR AND IMAGE DISPLAY METHOD

(71) Applicant: NEC Display Solutions, Ltd., Tokyo (JP)

(72) Inventor: Atsushi Katou, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,386

(22) Filed: Aug. 6, 2014

(65) Prior Publication Data

US 2014/0347566 A1 Nov. 27, 2014

Related U.S. Application Data

(63) Continuation of application No. 13/995,478, filed as application No. PCT/JP2010/073016 on Dec. 21, 2010, now Pat. No. 8,833,944.

(51) Int. Cl.
| | |
|---|---|
| *H04N 9/31* | (2006.01) |
| *G03B 21/14* | (2006.01) |
| *G03B 21/20* | (2006.01) |
| *G03B 33/12* | (2006.01) |
| *H04N 9/12* | (2006.01) |

(52) U.S. Cl.
CPC .............. *H04N 9/3114* (2013.01); *G03B 21/14* (2013.01); *G03B 21/2033* (2013.01); *G03B 33/12* (2013.01); *H04N 9/12* (2013.01); *H04N 9/3105* (2013.01); *H04N 9/3167* (2013.01); *H04N 9/3182* (2013.01)

(58) Field of Classification Search
CPC ... H04N 9/315; H04N 9/3105; H04N 9/3197; G03B 21/14; G03B 21/2033; G02B 26/007
USPC ........ 353/31, 37, 38, 84, 85, 94; 362/84, 231, 362/293, 317, 551, 393
See application file for complete search history.

(56) References Cited

U.S. PATENT DOCUMENTS

| | | | |
|---|---|---|---|
| 6,345,894 B1 | 2/2002 | Mori | |
| 2004/0223342 A1* | 11/2004 | Klipstein | .................. G01J 3/10 362/555 |

(Continued)

FOREIGN PATENT DOCUMENTS

| | | |
|---|---|---|
| JP | 62-059919 A | 3/1987 |
| JP | 6-72987 B2 | 9/1994 |

(Continued)

OTHER PUBLICATIONS

Japanese Office Action dated Jan. 6, 2015, with partial English Translation.

(Continued)

*Primary Examiner* — Sultan Chowdhury
(74) *Attorney, Agent, or Firm* — McGinn IP Law Group PLLC

(57) ABSTRACT

An image display method implemented in a projector that includes first to third display elements each of which spatially modulates incident light to display an image, synthesizes the images displayed by the first to third display elements, and projects the synthesized image.

18 Claims, 15 Drawing Sheets

(56) References Cited

U.S. PATENT DOCUMENTS

| | | |
|---|---|---|
| 2004/0263500 A1 | 12/2004 | Sakata |
| 2005/0248733 A1 | 11/2005 | Sakata et al. |
| 2006/0227302 A1 | 10/2006 | Harbers et al. |
| 2007/0052928 A1 | 3/2007 | Maeda et al. |
| 2007/0070304 A1 | 3/2007 | Sakata |
| 2007/0070305 A1 | 3/2007 | Sakata |
| 2008/0030984 A1 | 2/2008 | Harbers et al. |
| 2008/0143967 A1 | 6/2008 | Bierhuizen et al. |
| 2008/0143970 A1 | 6/2008 | Harbers et al. |
| 2008/0158514 A1* | 7/2008 | Penn et al. .............. 353/31 |
| 2011/0075106 A1 | 3/2011 | Shibasaki |
| 2013/0100639 A1 | 4/2013 | Li et al. |
| 2013/0169894 A1 | 7/2013 | Quderkirk et al. |
| 2013/0335642 A1 | 12/2013 | Fujioka |

FOREIGN PATENT DOCUMENTS

| | | |
|---|---|---|
| JP | 07-294867 A | 11/1995 |
| JP | 2004-325477 A | 11/2004 |
| JP | 2005-283817 A | 10/2005 |
| JP | 2005-321524 A | 11/2005 |
| JP | 2006-332042 A | 12/2006 |
| JP | 2007-065408 A | 3/2007 |
| JP | 2007-065412 A | 3/2007 |
| JP | 2007-065429 A | 3/2007 |
| JP | 2007-93970 A | 4/2007 |
| JP | 2009-194161 A | 8/2009 |
| JP | 2010-513945 A | 4/2010 |
| WO | WO 2008/072195 A1 | 6/2008 |

OTHER PUBLICATIONS

International Search Report dated Feb. 8, 2011 in PCT/JP2010/072669 with and English Translation.

United States Office Action dated Dec. 13, 2013 in co-pending U.S. Appl. No. 13/995,478.

United States Notice of Allowance dated May 19, 2014 in co-pending U.S. Appl. No. 13/995,478.

* cited by examiner

PROJECTOR AND IMAGE DISPLAY METHOD

The present application is a Continuation Application of U.S. patent application Ser. No. 13/995,478, filed on Jun. 18, 2013, which is based on and claims priority from International Application No. PCT/JP2010/073016, filed on Dec. 21, 2010, the entire contents of which are incorporated herein by reference.

TECHNICAL FIELD

The present invention relates to a projector, and more particularly to a 3-plate projector that includes three display elements and projects a color image formed by synthesizing red, green, and blue images respectively displayed on the display elements.

BACKGROUND ART

Generally, the projector is under restrictions of etendue determined by the light emission area and the divergence angle of a light source. The etendue restricts how much light from the light source can be used as projected light.

In other words, in the projector, if the value that is the product of the area of the light source and the angle of divergence is not made less than or equal to the value of the product of the area of a display element (e.g., liquid crystal panel) and the acceptance angle (solid angle) that is determined by the f-number of the projection lens, the light from the light source cannot be efficiently used as projected light. Thus, for example, even if a number of LEDs greater than a maximum number determined by the restrictions of the etendue are arranged in an array or a LED having a light emission area larger than a maximum light emission area determined by the restrictions of the etendue is used, the brightness of a projected image cannot be improved.

Patent Literature 1 discloses a 3-plate projector capable of expanding a color reproduction range without any reduction of light use efficiency caused by the etendue restrictions.

The 3-plate projector described in Patent Literature 1 includes first and second green LEDs whose peak wavelengths are different from each other, a red LED, and a blue LED.

The optical axis of the first green LED is orthogonal to that of the second green LED, and a dichroic mirror is arranged in a position where the optical axes of the first and second green LEDs intersect each other.

A green optical beam emitted from the first green LED is reflected by the dichroic mirror, and the reflected light is applied to a green liquid crystal panel. A green optical beam emitted from the second green LED passes through the dichroic mirror, and the passed light is applied to the green liquid crystal panel. The first and second green LEDs are both driven by current twice as large as rated current.

A red optical beam emitted from the red LED is applied to a red liquid crystal panel. A blue optical beam emitted from the blue LED is applied to a blue liquid crystal panel. The red and blue LEDs are both driven by the rated current.

A light flux passed through the green liquid crystal panel is orthogonal to a light flux passed through the red liquid crystal panel and, at their intersection, is orthogonal to a light flux passed through the blue liquid crystal panel. A cross dichroic prism is arranged in a position where the light fluxes intersect each other.

The cross dichroic prism synthesizes red image light from the red liquid crystal panel, green image light from the green liquid crystal panel, and blue image light from the blue liquid crystal panel. Image light synthesized by the cross dichroic prism is projected to a screen by a projection lens.

In the 3-plate projector, the red LED is lit for a period of one frame, and an image based on a red luminance signal is displayed on the red liquid crystal panel. Similarly, the blue LED is lit for a period of one frame, and an image based on a blue luminance signal is displayed on the blue liquid crystal panel.

The first green LED is lit, of first and second subframes constituting one frame, for a period of the first subframe, and an image based on a first green luminance signal is displayed on the green liquid crystal panel. The second green LED is lit for a period of the second subframe, and an image based on a second green luminance signal is displayed on the green liquid crystal panel. Accordingly, on the green liquid crystal panel, a first green image based on the first green luminance signal and a second green image based on the second green luminance signal are alternately displayed for each subframe.

According to the control, during the period of one frame, an image can be displayed by the four lights of red, first and second green, and blue. A color reproduction range in this case is wider than that when an image is displayed by the three color lights of red, green, and blue for the period of one frame.

The first green LED is driven by current twice as large as the rated current. Thus, when the ratio of the first subframe and the second subframe in one frame is 50:50, the amount of light acquired when the first green LED is lit for the period of the first subframe is approximately equal to that acquired when the first green LED is driven by the rated current to be lit for the period of the first frame. The second green LED is similarly driven by current twice as large as the rated current. Thus, an amount of light approximately equal to that acquired when the second green LED is driven by the rated current to be lit for the period of the first frame can be acquired. As a result, reduction in luminance caused by alternate lighting of the first and second green LEDs for each subframe can be prevented.

Further, the first green optical beam emitted from the first green LED and the second green optical beam emitted from the second green LED are applied on the same optical path to the green liquid crystal panel via the dichroic mirror. According to this configuration, as long as the light emission areas of the first and second green LEDs are within an area range determined by the etendue restrictions, most of the first and second green optical beams emitted from the first and second green LEDs are used as projected light.

Similarly, as long as the light emission areas of the red LED and the blue LED are within the area range determined by the etendue restrictions, most of the red and blue optical beams emitted from the red LED and the blue LED are used as projected light.

CITATION LIST

Patent Literature 1: JP2004-325477A

SUMMARY OF INVENTION

Problems to be Solved by Invention

Generally, the cutoff wavelength of the dichroic mirror has a transmittance of 50%. In the projector described in Patent Literature 1, to reflect the first green optical beam emitted from the first green LED while transmitting the second green optical beam emitted from the second green LED, the cutoff wavelength of the dichroic mirror is set to reflect light having a wavelength equal to or lower than the emission wavelength of the first green LED while transmitting other lights.

However, since the rising part of a curve (portion defining cutoff) indicating the spectral transmission characteristics of the dichroic mirror has a certain inclination, a sufficient transmittance (or reflectance) cannot be acquired for light having a wavelength in the neighborhood of the cutoff wavelength. For example, when the difference between the emission wavelength of the first green LED and the cutoff wavelength is small, a part of the first green optical beam emitted from the first green LED is transmitted through the dichroic mirror. Consequently, the reflected amount of the first green optical beam emitted from the dichroic mirror is reduced. When the difference between the emission wavelength of the second green LED and the cutoff wavelength is small, a part of the second green optical beam emitted from the second green LED is reflected or absorbed by the dichroic mirror. Consequently, the transmitted amount of the second green optical beam emitted from the dichroic mirror is reduced.

The problem in which a certain amount of light is reduced in the dichroic mirror can be solved by increasing the differences between the cutoff wavelength of the dichroic mirror and the emission wavelengths of the first and second green LEDs. In this case, however, since the difference between the emission wavelength of the first green LED and the emission wavelength of the second green LED is larger, the color purity of green included in a projected image drops, consequently reducing color reproducibility.

On the other hand, by reducing the difference between the emission wavelength of the first green LED and the emission wavelength of the second green LED, the color purity of the green color included in the projected image can be increased. In this case, however, the problem in which a certain amount of light is reduced in the dichroic mirror occurs.

As described above, there is a trade-off between the problem of the amount of light reduction in the dichroic mirror and the reduction of the color purity of the green included in the projected image. In the projector described in Patent Literature 1, it is difficult to simultaneously solve these problems.

It is therefore an object of the present invention to provide a projector and an image display method that can solve both the problem in which a certain amount of light is reduced in the dichroic mirror and the problem in which the color purity of the green color included in the projected image is reduced and that can display a high-luminance image of high color reproducibility.

Solution to Problem

To achieve the object, according to an aspect of the present invention, a projector includes:
first to third display elements each of which spatially modulates incident light to display an image;
a first light source unit that includes a red light source that emits red light having a peak wavelength in a red wavelength band, the red light emitted from the red light source being applied to the first display element;
a second light source unit that includes a first green light source that emits first green light having a peak wavelength in a green wavelength band, the first green light emitted from the first green light source being applied to the second display element;
a third light source unit that includes a second green light source that emits second green light having a peak wavelength in the green wavelength band and a blue light source that emits blue light having a peak wavelength in a blue wavelength band, the second green light emitted from the second green light source and the blue light emitted from the blue light source being applied on the same optical path to the third display element;
color synthesizing means for synthesizing the images displayed by the first to third display elements;
a projection lens that projects the image synthesized by the color synthesizing means; and
control means for controlling, based on an input video signal, display operations of the first to third display elements and lighting operations of the red light source, the first and second green light sources, and the blue light source.

In this case, the control means lights, for a predetermined period, the red light source and the first green light source to display a red image based on the input video signal by the first display element and a green image based on the input video signal by the second display element, and
lights, for a first period, the second green light source to display the green image by the third display element, and lights, for a second period, the blue light source to display a blue image based on the input video signal by the third display element. The first and second periods are provided by dividing the predetermined period with a predetermined ratio.

According to another aspect of the present invention, a projector includes:
first to third display elements each of which spatially modulates incident light to display an image;
a first light source unit that includes a blue light source that emits blue light having a peak wavelength in a blue wavelength band, the blue light emitted from the blue light source being applied to the first display element;
a second light source unit that includes a first green light source that emits first green light having a peak wavelength in a green wavelength band, the first green light emitted from the first green light source being applied to the second display element;
a third light source unit that includes a second green light source that emits second green light having a peak wavelength in the green wavelength band and a red light source that emits red light having a peak wavelength in a red wavelength band, the second green light emitted from the second green light source and the red light emitted from the red light source being applied on the same optical path to the third display element;
color synthesizing means for synthesizing the images displayed by the first to third display elements;
a projection lens that projects the image synthesized by the color synthesizing means; and
control means for controlling, based on an input video signal, display operations of the first to third display elements and lighting operations of the red light source, the first and second green light sources, and the blue light source.

In this case, the control means lights, for a predetermined period, the blue light source and the first green light source to display a blue image based on the input video signal by the first display element and a green image based on the input video signal by the second display element, and
lights, for a first of period, the second green light source to display the green image by the third display element, and lights, for a second period, the red light source to display a red image based on the input video signal by the third display element. The first and second periods are provided by dividing the predetermined period with a predetermined ratio.

According to an aspect of the present invention, there is provided an image display method implemented in a projector that includes first to third display elements each of which spatially modulates incident light to display an image, synthesizes the images displayed by the first to third display elements, and projects the synthesized image.

The method includes:

irradiating, for a predetermined period, the first display element with red light having a peak wavelength in a red wavelength band to display a red image based on an input video signal by the first display element;

irradiating, for the predetermined period, the second display element with first green light having a peak wavelength in a green wavelength band to display a green image based on the input video signal by the second display element; and irradiating, for a first period, the third display element with second green light having a peak wavelength in the green wavelength band to display the green image by the third display element, and irradiating, for a second period, the third display element with blue light having a peak wavelength in the blue wavelength band on the same optical path as that of the second green light to display a blue image based on the input video signal by the third display element. The first and second periods are provided by dividing the predetermined period with a predetermined ratio.

According to another aspect of the present invention, there is provided an image display method implemented in a projector that includes first to third display elements each of which spatially modulates incident light to display an image, synthesizes the images displayed by the first to third display elements, and projects the synthesized image.

The method includes:

irradiating, for a predetermined period, the first display element with blue light having a peak wavelength in a blue wavelength band to display a blue image based on an input video signal by the first display element;

irradiating, for the predetermined period, the second display element with first green light having a peak wavelength in a green wavelength band to display a green image based on the input video signal by the second display element; and irradiating, for a first period, the third display element with second green light having a peak wavelength in the green wavelength band to display the green image by the third display element, and irradiating, for a second period, the third display element with red light having a peak wavelength in the red wavelength band on the same optical path as that of the second green light to display a red image based on the input video signal by the third display element. The first and second periods are provided by dividing the predetermined period with a predetermined ratio.

Figure 1:
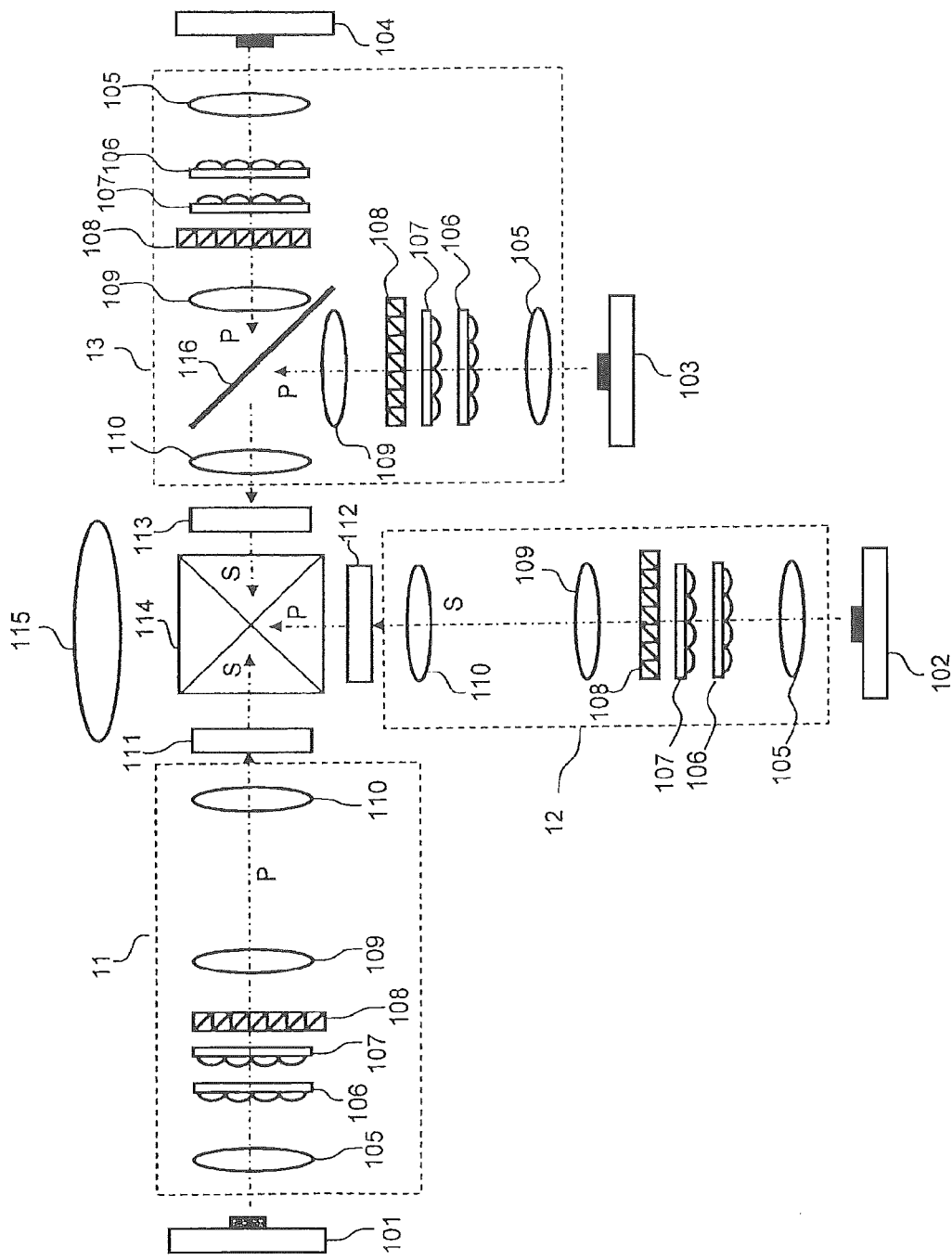
FIG. 1 A schematic diagram showing the configuration of a projector according to the first embodiment of the present invention.

REFERENCE NUMERALS 11 to 13: Lighting optical system
101: Red light source
102, 103: Green light source
104: Blue light source
111 to 113: Liquid crystal panel
114: Cross dichroic prism
115: Projection lens

DESCRIPTION OF EMBODIMENTS

Hereinafter, the embodiments of the present invention will be described with reference to the drawings.

First Embodiment

FIG. 1 is a schematic diagram showing the configuration of a projector according to the first embodiment of the present invention.

Referring to FIG. 1, the projector according to this embodiment includes red light source 101, green light sources 102 and 103, blue light source 104, lighting optical systems 11 to 13, liquid crystal panels 111 to 113, cross dichroic prism 114, and projection lens 115.

Red light source 101 that is a solid light source having a peak wavelength in a red wavelength band includes, for example, a LED or a semiconductor laser for emitting red light. Blue light source 104 that is a solid light source having a peak wavelength in a blue wavelength band includes, for example, a LED or a semiconductor laser for emitting blue light.

Each of green light sources 102 and 103 that is a solid light source having a peak wavelength in a green wavelength band includes, for example, a LED or a semiconductor laser for emitting green light. The peak wavelengths of green light sources 102 and 103 are equal to each other. However, that the peak wavelength varies by about ±10 to 20 nm in an LED or the like is recognized as a manufacturing problem. Thus, the peak wavelengths are assumed to be substantially equal to each other within the manufacturing variance range. Hereinafter, the equality of the peak wavelengths (or emission wavelengths) includes a case where the peak wavelengths completely match each other and a case where the peak wavelengths within the manufacturing variance range are substantially equal to each other.

The light emission area of each of red light source 101, green light sources 102 and 103, and blue light source 104 is set to be the maximum area within an area range satisfying the restrictions of etendue.

A red optical beam emitted from red light source 101 enters lighting optical system 11. Lighting optical system 11 includes illumination lenses 105, 109, and 110, fly-eye integrators 106 and 107, and polarization conversion element 108. In the traveling direction of the red optical beam from red light source 101, illumination lens 105, fly-eye integrators 106 and 107, polarization conversion element 108, and illumination lenses 109 and 110 are arranged in this order.

Fly-eye integrators 106 and 107 uniformly illuminate liquid crystal panel 111 with the red optical beam from red light source 101, and each of fly-eye integrators 106 and 107 includes a plurality of fly-eye lenses. The fly-eye lenses of fly-eye integrator 106 correspond one to one to those of fly-eye lens 107. The red optical beam from red light source 101 is divided into a plurality of light fluxes by fly-eye integrator 106. The plurality of divided light fluxes is stacked to form one light flux by fly-eye integrator 107.

Polarization conversion element 108 is divided into a plurality of areas in an in-plane direction. A light flux from fly-eye integrator 107 enters each area. Each area includes first and second prisms. Each of the first and second prisms is a rectangular solid prism formed by bonding two rectangular prisms.

The first prism, which includes a polarization separation film formed on the bonded surface of the two rectangular prisms to transmit P-polarized light while reflecting S-polarized light, is configured so that the divided light fluxes from fly-eye integrators 106 and 107 can enter the polarization separation film at an incident angle of about 45°. A surface located in the traveling direction of the P-polarized light transmitted through the polarization separation film is an exit surface, and the P-polarized light is output from the exit surface.

The second prism, which includes a reflection film formed on the bonded surface of the two rectangular prisms, is configured so that the S-polarized light reflected by the polarization separation film of the first prism can enter the reflection film at an incident angle of about 45°. A surface located in the traveling direction of the light reflected by the reflection film is an exit surface, and a wave plate is disposed in the exit surface to convert the S-polarized light into P-polarized plate.

The P-polarized light that exits from the first prism and the P-polarized light that exits from the second prism travel in the same direction.

Light fluxes (P-polarized light) that exit from polarization separation film 8 and are aligned in a polarizing direction are applied to liquid crystal panel 111 via illumination lenses 109 and 110.

A green optical beam emitted from green light source 102 enters lighting optical system 12. Lighting optical system 12, which is similar in configuration to lighting optical system 11, includes illumination lenses 105, 109, and 110, fly-eye integrators 106 and 107, and polarization conversion element 108. However, lighting optical system 12 is different from lighting optical system 11 in that polarization of light fluxes from the first and second prisms is set to emit a green optical beam of S-polarized light from lighting optical system 12.

A green optical beam emitted from green light source 103 and a blue optical beam emitted from blue light source 104 enter into lighting optical system 13 from different directions.

Lighting optical system 13 includes a first optical system into which the green optical beam from green light source 103 enters, a second optical system into which the blue optical beam from blue light source 104 enters, dichroic mirror 116, and illumination lens 110.

The first and second optical systems are basically similar in configuration and, in the traveling direction of the input optical beam, illumination lens 105, fly-eye integrators 106 and 107, polarization conversion element 108, and illumination lenses 109 and 110 are arranged in this order. In this case, a green optical beam of P-polarized light is emitted from the first optical system, and a blue optical beam of P-polarized light is emitted from the second optical system.

The optical axis of the first optical system is orthogonal to that of the second optical system, and dichroic mirror 116 is located at the intersection of the optical axes of the first and second optical systems. Dichroic mirror 116 has characteristics of reflecting the green optical beam of P-polarized light from the first optical system while transmitting the blue optical beam of P-polarized light from the second optical system.

The green optical beam of P-polarized light reflected by dichroic mirror 116 and the blue optical beam of P-polarized light transmitted through dichroic mirror 116 enter illumination lens 10 on the same optical path.

The optical axes of lighting optical systems 11 to 13 are parallel to the same plane. The optical axis of lighting optical system 12 is orthogonal to that of lighting optical system 11 and, at the intersection thereof, orthogonal to the optical axis of lighting optical system 13. The optical axes of lighting optical systems 11 to 13 correspond to paths through which the center rays of the output optical beams pass.

Cross dichroic prism 114 is located at the intersection of the optical axes of lighting optical systems 11 to 13.

Liquid crystal panel 111, which includes polarization plates (not shown) back and forth and which is located between lighting optical system 11 and cross dichroic prism 114, spatially modulates the red optical beam of P-polarized light output from lighting optical system 11 according to an input driving signal.

Liquid crystal panel 112, which includes polarization plates (not shown) back and forth and which is located between lighting optical system 12 and cross dichroic prism 114, spatially modulates the green optical beam of S-polarized light output from lighting optical system 12 according to the input driving signal.

Liquid crystal panel 113, which includes polarization plates (not shown) back and forth and which is located between lighting optical system 13 and cross dichroic prism 114, spatially modulates the green or blur optical beam of P-polarized light output from lighting optical system 13 according to the input driving signal.

Cross dichroic prism 114 is color synthesizing means for synthesizing color image lights from liquid crystal panels 111 to 113.

Figure 2:
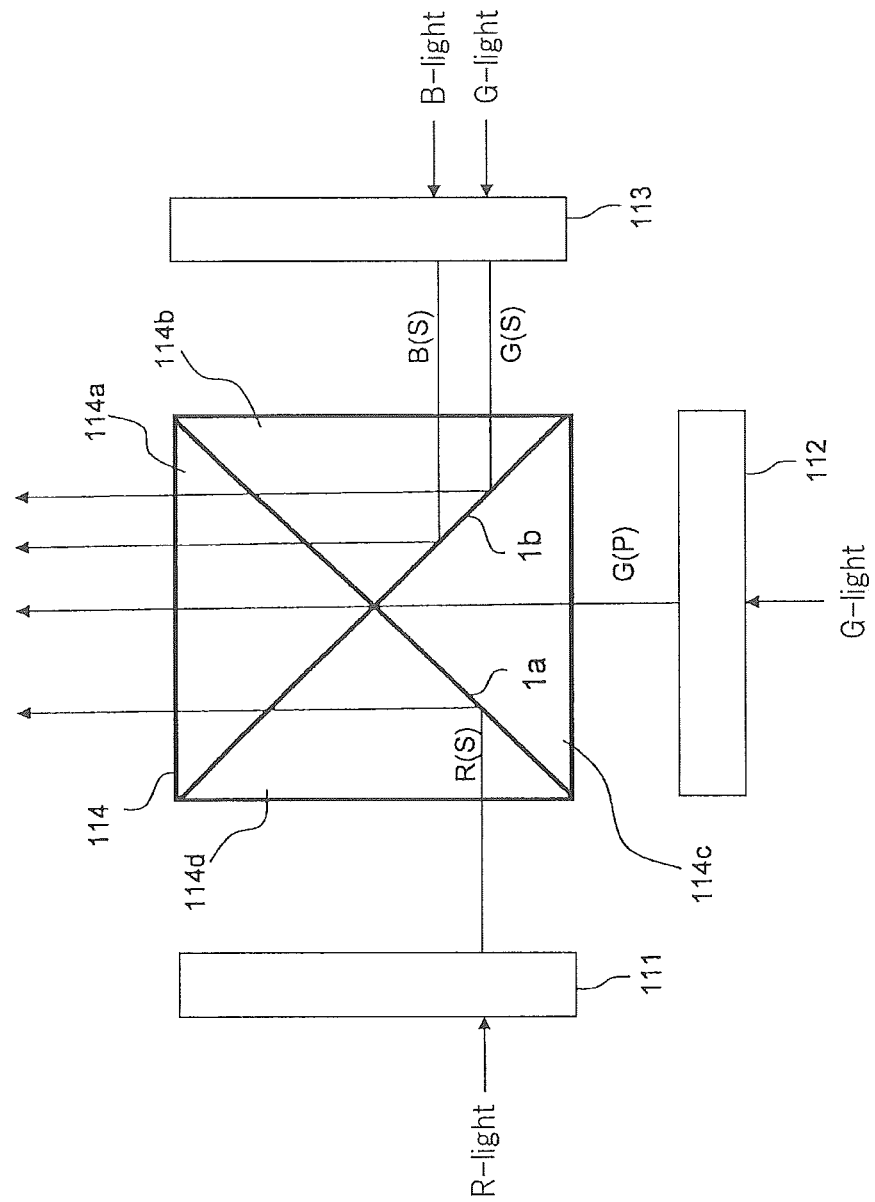
FIG. 2 A schematic diagram showing an example of the cross dichroic prism of the projector shown in FIG. 2.

As shown in FIG. 2, cross dichroic prism 114 includes four rectangular prisms 114a to 114d having right-angle surfaces bonded together.

A first uniform plane is formed by the bonded surface of rectangular prisms 114a and 114b and the bonded surface of rectangular prisms 114c and 114d, and dichroic film 1a is formed on the first plane. A second uniform plane is formed by the bonded surface of rectangular prisms 114a and 114d and the bonded surface of rectangular prisms 114b and 114c, and dichroic film 1b is formed on the second plane. The first and second uniform planes intersect each other.

The red optical beam of S-polarized light that has passed through liquid crystal panel 111 enters one surface of dichroic film 1a at an incident angle of about 45°, and the green optical beam of P-polarized light that has passed through liquid crystal panel 112 enters the other surface of dichroic film 1a at an incident angle of about 45°. The green optical beam of P-polarized light that has passed through liquid crystal panel 112 enters one surface of dichroic film 1b at an incident angle of about 45°, and the green or blue optical beam of S-polarized light that has passed through liquid crystal panel 113 enters the other surface of dichroic film 1b at an incident angle of about 45°.

Dichroic film 1a has characteristics of reflecting the red optical beam of S-polarized light from liquid crystal panel 111 while transmitting the green optical beam of P-polarized light from liquid crystal panel 112.

Figure 3A:
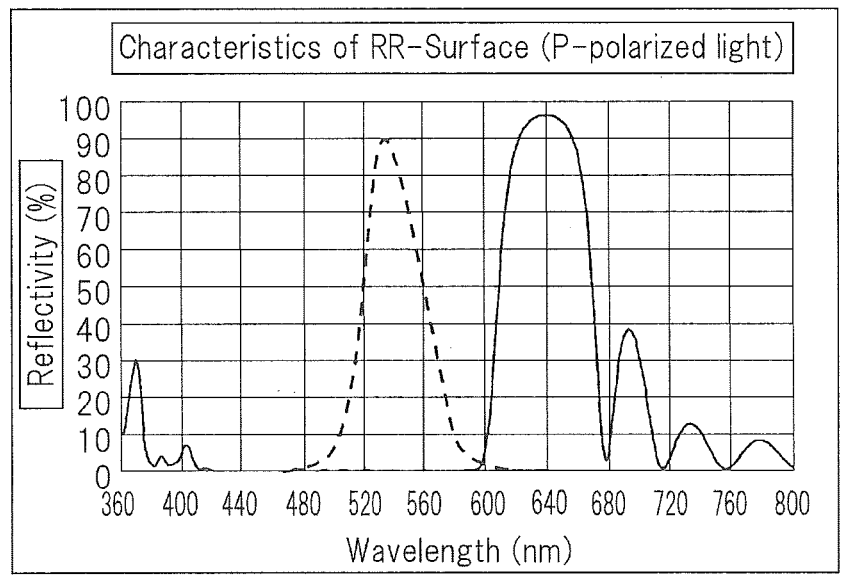
FIG. 3A A characteristic diagram showing spectral reflection characteristics of one dichroic film of the cross dichroic prism shown in FIG. 2 for P-polarized light.

FIG. 3A shows spectral reflection characteristics for the P-polarized light of dichroic film 1a. In FIG. 3A, a solid line indicates spectral reflection characteristics for the P-polarized light, and a broken line indicates an emission spectrum of each of green LEDs 102 and 103.

A cutoff wavelength is defined to be a wavelength having a transmittance of 50%. The cutoff wavelength of dichroic film 1a for light entered as P-polarized light is set to reflect light equal to or higher than a red wavelength band and transmit lights of other wavelength bands (including green and blue wavelength bands).

Figure 3B:
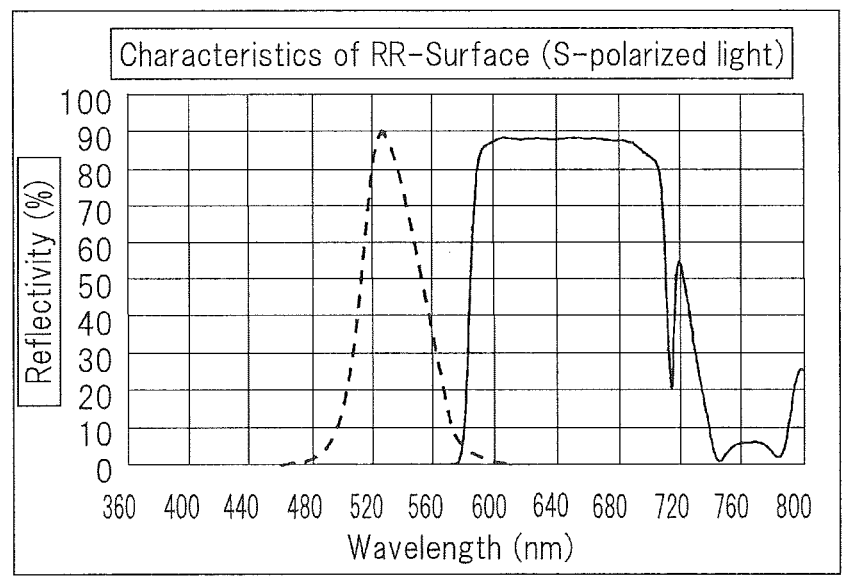
FIG. 3B A characteristic diagram showing spectral reflection characteristics of one dichroic film of the cross dichroic prism shown in FIG. 2 for the P-polarized light.

FIG. 3B shows spectral reflection characteristics for the S-polarized light of dichroic film 1a. In FIG. 3B, a solid line indicates spectral reflection characteristics for the S-polarized light, and a broken line indicates an emission spectrum of each of green LEDs 102 and 103.

As in the case of the characteristics shown in FIG. 3A, the cutoff wavelength of dichroic film 1a for light entered as S-polarized light is set to reflect light equal to or higher than a red wavelength band and transmit lights of other wavelength bands (including green and blue wavelength bands).

Dichroic film 1b has characteristics of reflecting the green or blue optical beam of S-polarized light from liquid crystal panel 113 while transmitting the green optical beam of P-polarized light from liquid crystal panel 112.

Figure 4A:
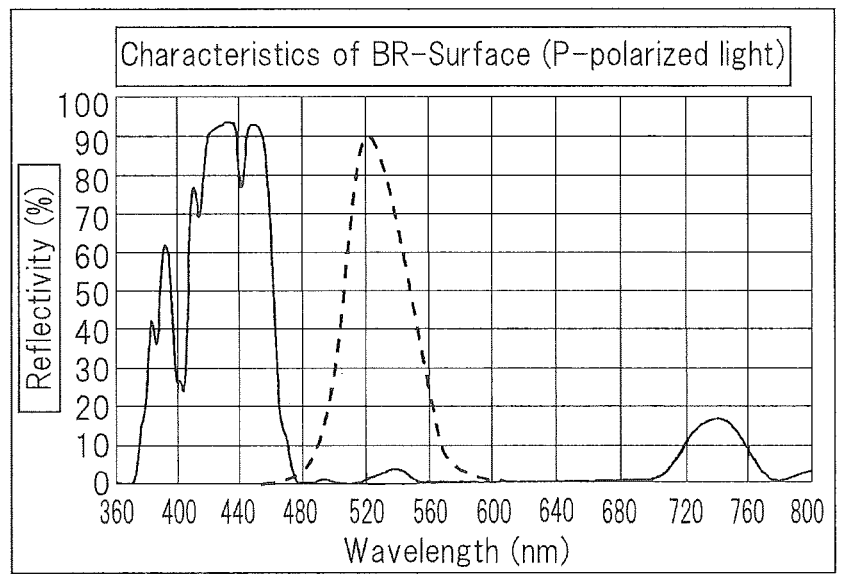
FIG. 4A A characteristic diagram showing spectral reflection characteristics of the other dichroic film of the cross dichroic prism shown in FIG. 2 for the P-polarized light.

FIG. 4A shows spectral reflection characteristics for the P-polarized light of dichroic film 1b. In FIG. 4A, a solid line indicates spectral reflection characteristics for the P-polarized light, and a broken line indicates an emission spectrum of each of green LEDs 102 and 103.

The cutoff wavelength of dichroic film 1b for light entered as P-polarized light is set to reflect light equal to or higher than a blue wavelength band and transmit lights of other wavelength bands (including green and red wavelength bands).

Figure 4B:
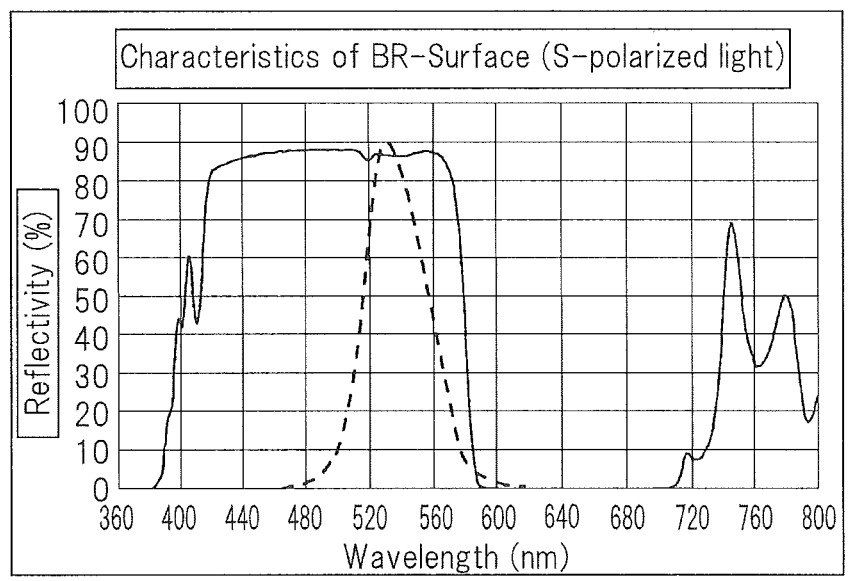
FIG. 4B A characteristic diagram showing spectral reflection characteristics of the other dichroic film of the cross dichroic prism shown in FIG. 2 for the P-polarized light.

FIG. 4B shows spectral reflection characteristics for the S-polarized light of dichroic film 1b. In FIG. 4B, a solid line indicates spectral reflection characteristics for the S-polarized light, and a broken line indicates an emission spectrum of each of green LEDs 102 and 103.

The cutoff wavelength of dichroic film 1b for light entered as S-polarized light is set to reflect light equal to or higher than a green wavelength band and transmit lights of other wavelength bands (including red wavelength band).

Dichroic film 1a having spectral reflection characteristics shown in FIGS. 3A and 3B and dichroic film 1b having spectral reflection characteristics shown in FIGS. 4A and 4B can both be formed by including dielectric multilayer films. In this case, cutoff wavelength setting can be adjusted based on the material of the dielectric multilayer film, the number of stacked layers, a film thickness, or a refractive index.

In cross dichroic prism 114 shown in FIG. 2, the slope of rectangular prism 114a is an exit surface. The red image light from liquid crystal panel 111 is reflected on dichroic film 1a, and the reflected image light is output from the exit surface. The green image light from liquid crystal panel 112 is transmitted through dichroic films 1a and 1b, and the transmitted image light is output from the exit surface. The green or blue image light from liquid crystal panel 113 is reflected on dichroic film 1b, and the reflected image light is output from the exit surface. Accordingly, image light synthesizing the red, blue and green image lights is output from the exit surface of cross dichroic prism 114.

Projection lens 115 is located to face the exit surface of cross dichroic prism 114. Projection lens 115 projects the image light output from the exit surface of cross dichroic prism 114 to an external screen. The external screen can be an exclusive screen or a structure such as a wall.

Next, the configuration of the control system of the projector according to the embodiment will be described.

Figure 5:
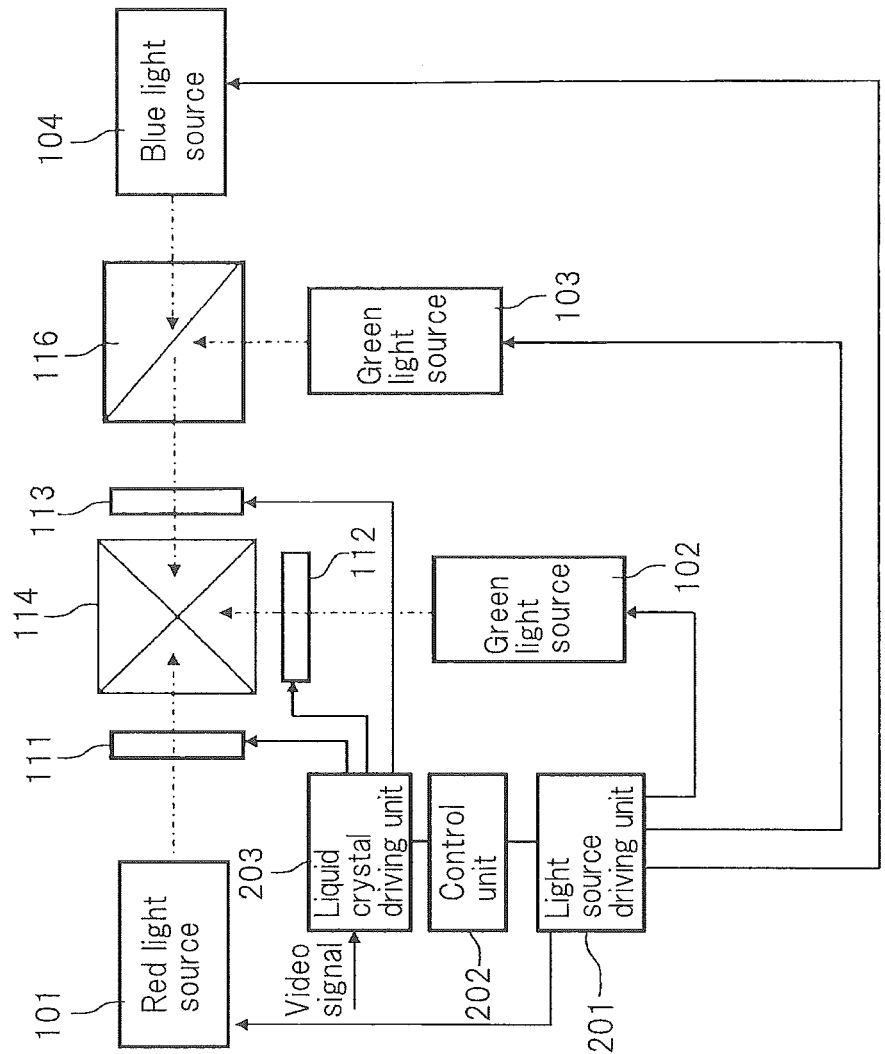
FIG. 5 A block diagram showing the configuration of the projector including a control system shown in FIG. 1.

FIG. 5 shows the configuration of the control system. FIG. 5 is conceptual block diagram that omits the lighting systems for simplicity of description.

Referring to FIG. 5, the control system includes light source driving unit 201, control unit 202, and liquid crystal driving unit 203.

Control unit 202 supplies a driving timing signal indicating the driving timing of each of liquid crystal panels 111 to 113 to liquid crystal driving unit 203. Control unit 202 supplies a lighting timing signal indicating the lighting timing of each of green light sources 102 and 103 to light source driving unit 201.

Light source driving unit 201 individually controls turning-ON or OFF of lights of red light source 101, green light sources 102 and 103, and blue light source 104 according to the lighting timing signals from control unit 202.

Liquid crystal driving unit 203 individually controls three liquid crystal panels 111 to 113 based on a video signal input from an external video supply device and the driving timing signals from control unit 202. The external video supply device is an information processing device such as a personal computer.

Figure 6:
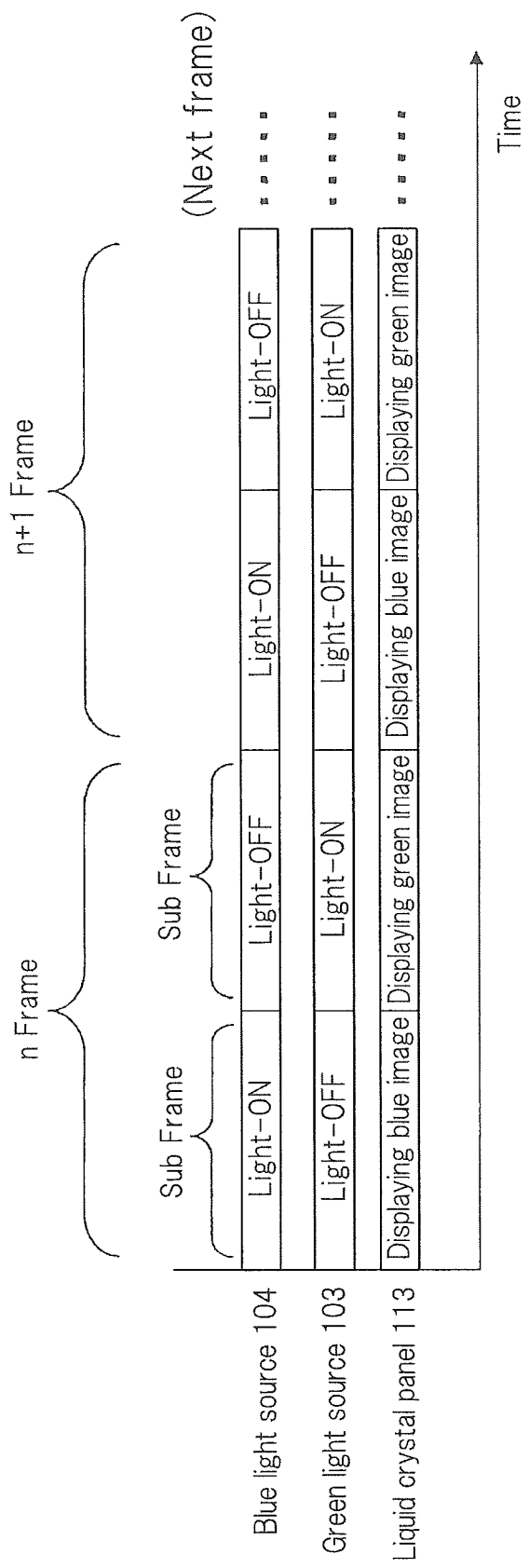
FIG. 6 An explanatory diagram showing the lighting timings of a green light source and a blue light source by the control system shown in FIG. 5 and the driving timings of liquid crystal panels irradiated with lights from the light sources.

FIG. 6 shows the lighting timing of green light source 103 and blue light source 104 and the driving timing of liquid crystal panel 113.

Referring to FIG. 6, one frame includes first and second subframes. In this example, the first and second subframes are equal in length. For example, a frame period is 60 Hz, and a subframe period is 120 Hz.

During the period of the first subframe, light source driving unit 201 sets blue light source 104 in a light-ON state, and green light source 103 in a light-OFF state, and liquid crystal driving unit 203 displays an image based on a blue video signal acquired from an input video signal on liquid crystal panel 113. In this case, a blue image is displayed on liquid crystal panel 113.

During the period of the second subframe, light source driving unit 201 sets blue light source 104 in a light-OFF state, and green light source 103 in a light-ON state, and liquid crystal driving unit 203 displays an image based on a green video signal acquired from an input video signal on liquid crystal panel 113. In this case, a green image is displayed on liquid crystal panel 113.

According to an operation shown in FIG. 6, the image based on the blue video signal and the image based on the green video signal are displayed in time division on liquid crystal panel 113. During the display period of the image based on the blue video signal on liquid crystal panel 113, only blue light source 104 is lit. During the display period of the image based on the green video signal on liquid crystal panel 113, only green light source 103 is lit. Accordingly, the blue image and the green image are alternately displayed for each subframe on liquid crystal panel 113.

Figure 7:
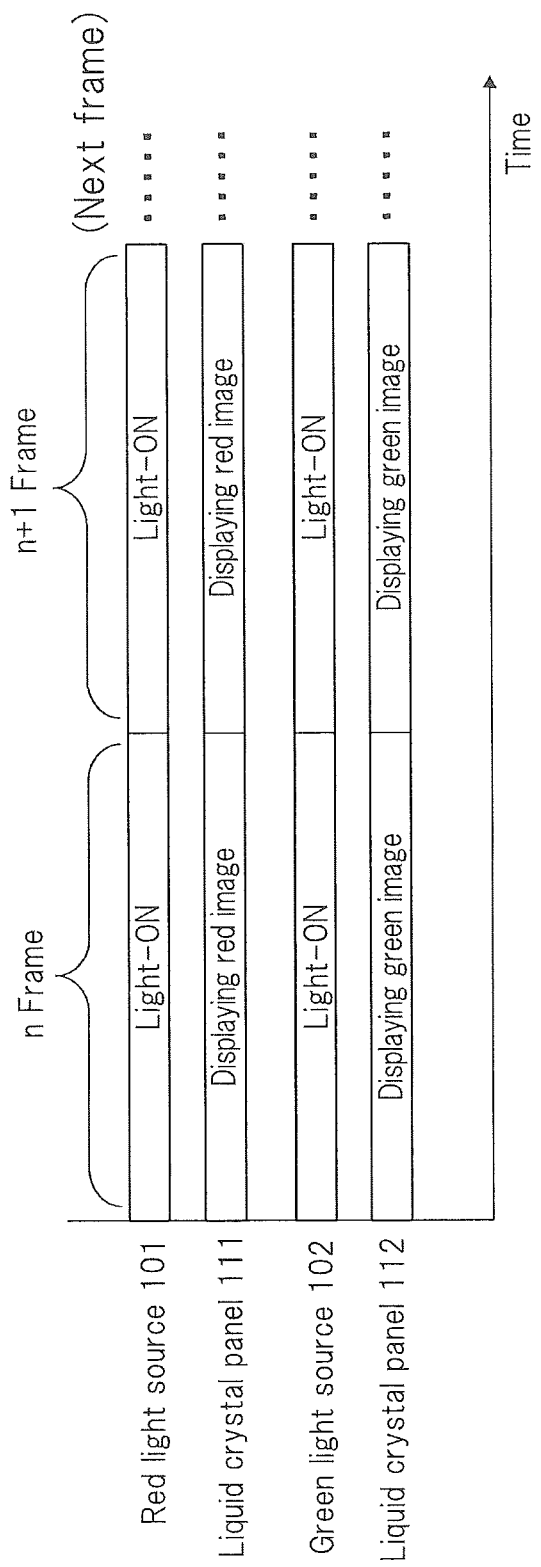
FIG. 7 An explanatory diagram showing the lighting timings of a red light source and another green light source by the control system shown in FIG. 5 and the driving timings of liquid crystal panels irradiated with lights from the light sources.

FIG. 7 shows the lighting timing of red light source 101 and green light source 102 and the driving timing of liquid crystal panels 111 and 112.

Referring to FIG. 7, during the period of one frame, light source driving unit 201 sets red light source 101 in a light-ON state, and liquid crystal driving unit 203 displays an image based on a red video signal acquired from an input video signal on liquid crystal panel 111. In this case, a red image is displayed on liquid crystal panel 111.

Similarly, during the period of one frame, light source driving unit 201 sets green light source 102 in a light-ON state, and liquid crystal driving unit 203 displays an image based on a green video signal acquired from an input video signal on liquid crystal panel 112. In this case, a green image is displayed on liquid crystal panel 112.

According to an operation shown in FIG. 7, red light source 101 and green light source 102 are both lit during the period of one frame, the red image based on the red video signal is displayed on liquid crystal panel 111, and the green image based on the green video signal is displayed on liquid crystal panel 112.

According to the embodiment, as shown in FIGS. 6 and 7, in the n-th frame of the input video signal, the blue image and the green image acquired from the video signal of the n-th frame are displayed in time division on liquid crystal panel 113, the red image acquired from the video signal of the n-th frame is displayed on liquid crystal panel 111, and the green image acquired from the video signal of the n-th frame is displayed on liquid crystal panel 112. In other words, the projected image in the n-th frame includes the green image and the blue image displayed in time division on liquid crystal panel 113, the red image displayed on liquid crystal panel 111, and the green image displayed on liquid crystal panel 112.

The projector according to the embodiment provides the effect of synthesizing three primary colors at a desired color mixing ratio and acquiring white light of high white balance.

Hereinafter, the effect will specifically be described.

As a comparative example, a configuration where green light source 103, the first optical system of lighting optical system 13, and dichroic mirror 11 are removed from the configuration shown in FIG. 1 and the blue optical beam from lighting optical system 13 is applied to liquid crystal panel 113 will be discussed.

In the comparative example, when red light source 101, green light source 102, and blue light source 104 are each driven by the rated current, the chromaticity of the image light synthesized by cross dichroic prism 114 greatly shifts from the white chromaticity of standard illuminant D65 toward a blue-violet color. This occurs, because compared with a light amount ratio to acquire desired white chromaticity, the light output of green light source 102 is relatively weak while the light output of blue light source 104 is relatively strong.

On the other hand, according to the projector of the embodiment, since green light source 103 having an emission wavelength equal to that of green light source 102 is added, during the period of one frame, the amount of green light included in the projected image increases by an amount equivalent to the green light from green light source 103.

Green light source 102 is lit for the period of one frame, while green light source 103 is lit for the period of a subframe that is half of one frame. When green light sources 102 and 103 are both driven by the rated current, the light amount of green light source 103 included in the projected image during the period of one frame is about half of that of green light source 102. Accordingly, the increase of the amount of green light caused by the addition of green light source 103 is greater by about 1.5 times than that when only green light source 102 is driven for the period of one frame.

By using the amount of green light increased by 1.5 times as a reference, the light amounts of red light source 101 and blue light source 104 are set to achieve optimal white balance.

In the aforementioned case, red light source 101 is driven by current larger than that when only green light source 102 is driven by the rated current to achieve optimal white balance.

Blue light source 104 is lit for the period of a subframe that is half of one frame. In this case, the light amount of blue light source 104 included in the projected image during the period of one frame is about half of that when blue light source 104 is driven for the period of one frame. Accordingly, blue light source 104 is driven by larger current (e.g., current that is twice as large as the rated current).

The driving current increase of red light source 101 and blue light source 104 is accompanied by increases in the amounts of red and blue lights included in the projected image during the period of one frame.

As described above, according to the lighting device of the embodiment, since the amounts of red, green, and blue lights included in the projected image during the period of one frame can be increased, the luminance of the projected image can be increased.

There is a sufficiently large difference in the emission wavelength between green light source 103 and blue light source 104. The problem in which a certain amount of light is reduced in dichroic mirror 116, which occurs in the case of the aforementioned projector of Patent Literature 1, can be prevented.

Further, since the emission wavelengths of green light sources 102 and 103 are roughly equal to each other, the problem in which there is a reduction in the color purity of the green light included in the projected image, which occurs in the case of the aforementioned projector of Patent Literature 1, can be prevented.

Further, the emission areas of red light source 101, green light sources 102 and 103, and blue light source 104 all satisfy the etendue restrictions. Thus, most of the optical beams respectively output from red light source 101, green light sources 102 and 103, and blue light source 104 can be used as projected light.

By appropriately setting driving current for red light source 101, green light sources 102 and 103, and blue light source 104, the ratio of the amount of respective lights, i.e., red, green and blue, included in the projected image can be set to achieve optimal white balance. For those among red light source 101, green light sources 102 and 103, and blue light source 104 having driving current exceeding the rated current, cooling means such as a fan can be provided to stabilize the operations of the light sources.

Further, since the blue image and the green image are displayed in time division on liquid crystal panel 113, the blue image is not mixed with a green, thus preventing reduction of blue reproducibility in the projected image.

The problem of the blue reproducibility caused by mixing with the green and its solution will specifically be described.

As a comparative example, a control process, in which in the configuration shown in FIG. 1, green light source 103 and blue light source 104 are lighted for the period of one frame and an image based on a blue video signal on liquid crystal panel 113 is displayed, will be discussed.

According to the comparative example, since green light source 103 is lit for the period of one frame, the amount of green light included in the projected image can be larger than that of the embodiment.

However, the blue image mixed with a green is displayed on liquid crystal panel 113. This reduces blue reproducibility in the projected image.

On the other hand, in the projector of the embodiment, since the blue image and the green image are displayed in time division on liquid crystal panel 113, the blue image is not mixed with a green.

Further, the projector of the embodiment produces the following effect.

For example, in a projector where a red LED emits a red optical beam to a red liquid crystal panel, a green LED emits a green optical beam to a green liquid crystal panel, and a blue LED emits a blue optical beam to a blue liquid crystal panel, to achieve high luminance, the red LED, the green LED, and the blue LED are desirably driven by the rated current.

However, the brightness ratio when the red LED, the green LED, and the blue LED are each driven by the rated current is, for example, R:G:B=168 lm:735 lm:168 lm, which does not satisfy the condition of the ratio of the amount of light for optimal white balance, i.e., R:G:B=0.35:1.0:0.07. The ratio of the amount of light for optimal white balance is the ratio of the amount of light that enables white chromaticity of standard illuminant D 65 to be acquired.

Normally, therefore, by using the amount of light of the green LED driven by the rated current as a reference, the amounts of light of the blue LED and the red LED are set to achieve optimal white balance. In this case, the ratio of the amount of light is R:G:B=257 lm:735 lm:51 lm. When this ratio of the amount of light is used, since the blue LED and the red LED are driven by current smaller than the rated current, sufficient light output performance cannot be exhibited. Consequently, the luminance of the projected image is low.

On the other hand, according to the projector of the embodiment, since two green light sources 102 and 103 are used, the amount of green light included in the projected image is greater than that when one green light source is used. In this case, by using the amount of green light included in the projected image as a reference when two green light sources 102 and 103 are driven by the rated current, the amounts of light of red light source 101 and blue light source 104 are set to achieve optimal white balance. Then, red light source 101 and blue light source 104 are driven by current larger than that when one green light source is driven by the rated current to achieve optimal white balance. Thus, red light source 101 and blue light source 104 can exhibit higher light output performance because of the increased driving current. As a result, the luminance of the projected image can be increased.

In the projector of the embodiment, the lighting control of red light source 101, green light sources 102 and 103, and blue light source 104 can be carried out by PWM (Pulse Width Modulation) or CW (Continuous Wave) modulation.

Liquid crystal panel 113 can be driven by a double-speed driving method.

LCOS (Liquid Crystal on Silicon) or DLP (Digital Light Processing) can be used for liquid crystal panels.

In the LCOS, a driving circuit and a pixel electrode have a structure where a liquid crystal is sandwiched between a silicon substrate and its opposite transparent substrate, and light transmitted through the transparent substrate and a liquid crystal layer is reflected by the pixel electrode. The DLP (registered trademark by Texas Instruments Incorporated) is a video display system using a digital mirror device (DMD).

The ratio of the first and second subframes, which is not limited to 50:50, can be appropriately set. For example, the ratio of the first and second subframes is desirably set to achieve optimal white balance (R:G:B=0.35:1.0:0.07) and satisfy the condition of driving red light source 101, green light sources 102 and 103, and blue light source 104 by the rated current. If red light source 101, green light sources 102 and 103, and blue light source 104 can be driven by the rated current, the operation of each light source can be stabilized without any cooling means.

In the configuration shown in FIG. 1, the relationship between the S-polarized light and the P-polarized light can be reversed. In this case, dichroic films 1a and 1b of cross dichroic prism 114, the spectral transmission characteristics of dichroic mirror 116, and the polarization separation film of polarization conversion element 108 must be changed according to the relationship between the S-polarized light and the P-polarized light.

Second Embodiment

Figure 8:
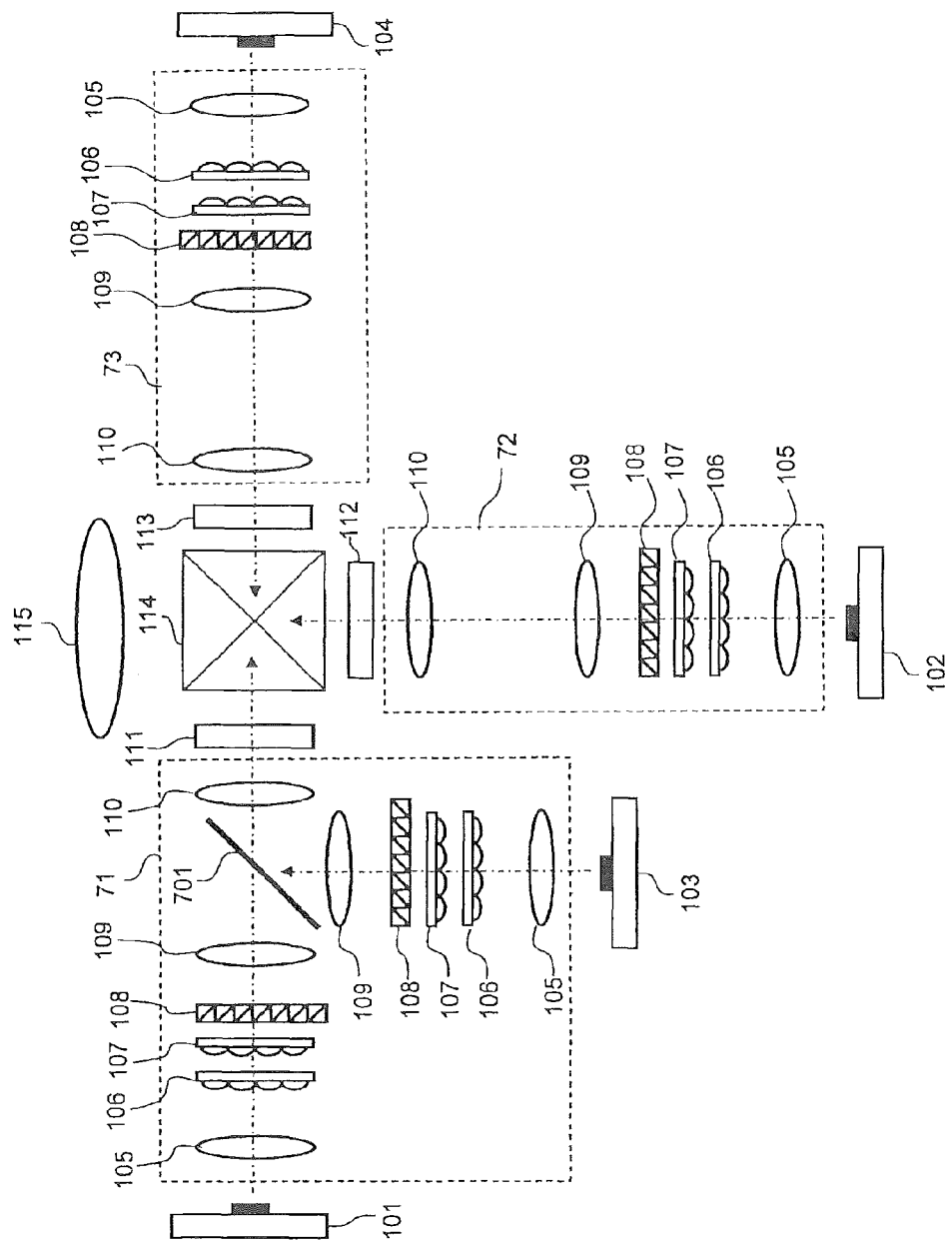
FIG. 8 A schematic diagram showing the configuration of a projector according to the second embodiment of the present invention.
Figure 9:
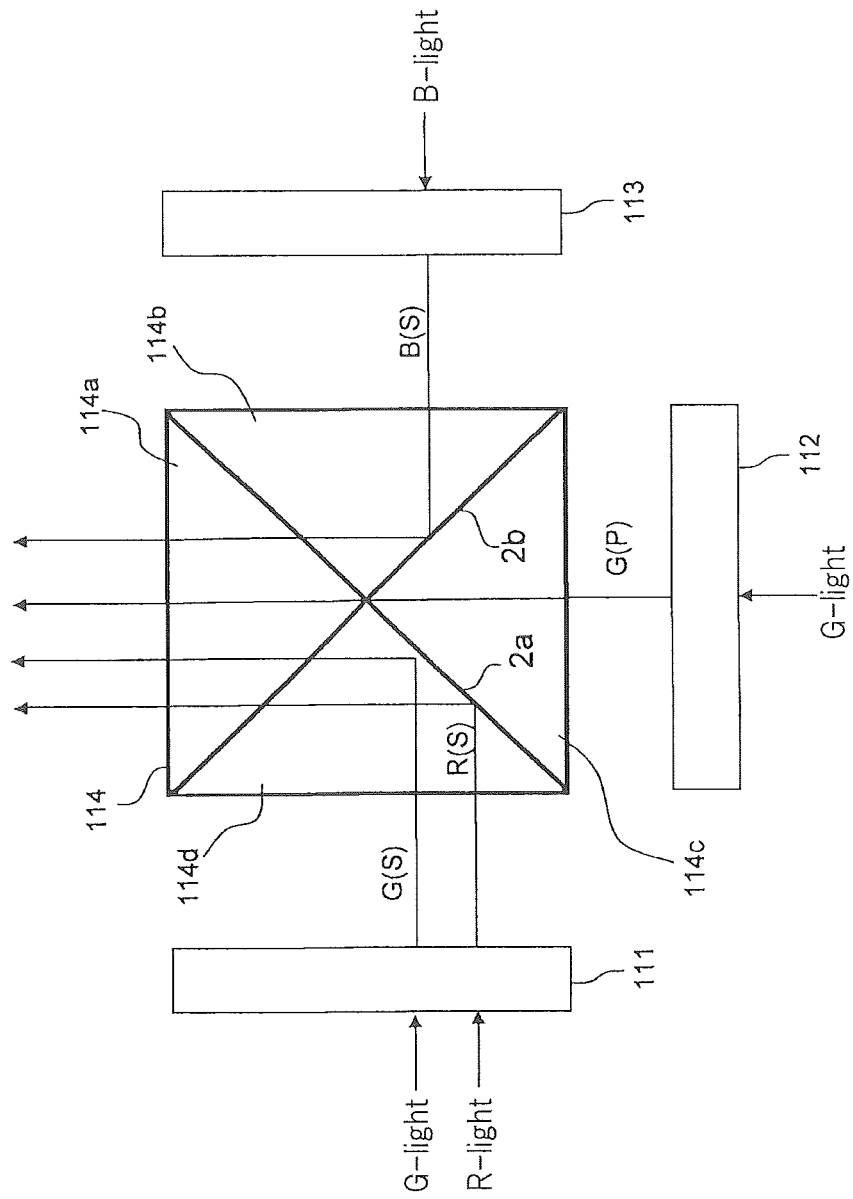
FIG. 9 A schematic diagram showing an example of the cross dichroic prism of the projector shown in FIG. 8.

FIG. 8 is a schematic diagram showing the configuration of a projector according to the second embodiment of the present invention.

The projector according to this embodiment includes red light source 101, green light sources 102 and 103, blue light source 104, lighting optical systems 71 to 73, liquid crystal panels 111 to 113, cross dichroic prism 114, and projection lens 115.

Red light source 101, green light source 102, blue light source 104, liquid crystal panels 111 to 113, cross dichroic prism 114, and projection lens 115 are similar to those of the first embodiment.

Green light source 103, which is similar to that of the first embodiment, is used as a light source for liquid crystal panel 111.

A red optical beam emitted from red light source 101 and a green optical beam emitted from green light source 103 enter into lighting optical system 71 from different directions.

Lighting optical system 71 includes a first optical system into which a red optical beam emitted from red light source 101 enters, a second optical system into which a green optical beam emitted from green light source 103 enters, dichroic mirror 701, and illumination lens 110.

The first and second optical systems are basically similar in configuration. In the traveling direction of an incident optical beam, illumination lens 105, fly-eye integrators 106 and 107, polarization conversion element 108, and illumination lens 109 are arranged in this order. Fly-eye integrators 106 and 107, polarization conversion element 108, and illumination lenses 105, 109 and 110 are similar to those of lighting optical system 11 of the first embodiment.

The optical axis of the first optical system is orthogonal to that of the second optical system, and dichroic mirror 701 is located at the intersection of the optical axes of the first and second optical systems. Dichroic mirror 701 has characteristics of transmitting the red optical beam of P-polarized light from the first optical system while reflecting the green optical beam of P-polarized light from the second optical system.

The red optical beam of P-polarized light transmitted through dichroic mirror 701 and the green optical beam of P-polarized light reflected by dichroic mirror 701 enter into illumination lens 110 on the same optical path.

A green optical beam emitted from green light source 102 enters into lighting optical system 72. Lighting optical system 12 includes illumination lens 105, fly-eye integrators 106 and 107, polarization conversion element 108, and illumination lenses 109 and 110 arranged in this order in the traveling direction of an incident optical beam. Fly-eye integrators 106 and 107, polarization conversion element 108, and illumination lenses 105, 109 and 110 are similar to those of lighting optical system 12 of the first embodiment.

A blue optical beam emitted from blue light source 104 enters into lighting optical system 13. Lighting optical system 12 includes illumination lens 105, fly-eye integrators 106 and 107, polarization conversion element 108, and illumination lenses 109 and 110 arranged in this order in the traveling direction of an incident optical beam. Fly-eye integrators 106 and 107, polarization conversion element 108, and illumination lenses 105, 109 and 110 are similar to those of lighting optical system 11 of the first embodiment.

The optical axes of lighting optical systems 71 to 73 are parallel to the same plane. The optical axis of lighting optical system 72 is orthogonal to that of lighting optical system 71 and, at the intersection thereof, orthogonal to the optical axis of lighting optical system 73. The optical axes of lighting optical systems 71 to 73 correspond to paths through which the center rays of the output optical beams pass.

Cross dichroic prism 114 is located at the intersection of the optical axes of lighting optical systems 71 to 73. Cross dichroic prism 114, which includes four rectangular prisms 114a to 114d shown in FIG. 2, includes dichroic films 2a and 2b in place of dichroic films 1a and 1b.

The cutoff wavelength of dichroic film 2a for light entered as P-polarized light is set to reflect light equal to or higher than a red wavelength band and transmit lights of other wavelength bands (including green and blue wavelength bands). The cutoff wavelength of dichroic film 2a for light entered as S-polarized light is set to reflect light equal to or higher than a green wavelength band and transmit lights of other wavelength bands (including blue wavelength band).

The cutoff wavelength of dichroic film 2b for light entered as P-polarized light is set to reflect light equal to or lower than a blue wavelength band and transmit lights of other wavelength bands (including green and red wavelength bands). The cutoff wavelength of dichroic film 2b for light entered as S-polarized light is set to reflect light equal to or lower than the blue wavelength band and transmit lights of other wavelength bands (including green and red blue wavelength bands).

Dichroic films 2a and 2b can both be formed by including dielectric multilayer films. In this case, cutoff wavelength setting can be adjusted based on the material of the dielectric multilayer film, the number of stacked layers, a film thickness, or a refractive index.

Next, the configuration of the control system of the projector according to the embodiment will be described.

The control system of the projector according to the embodiment is similar in configuration to that shown in FIG. 5. However, control by light source driving unit 201 and liquid crystal driving unit 203 is different from that of the first embodiment.

Figure 10:
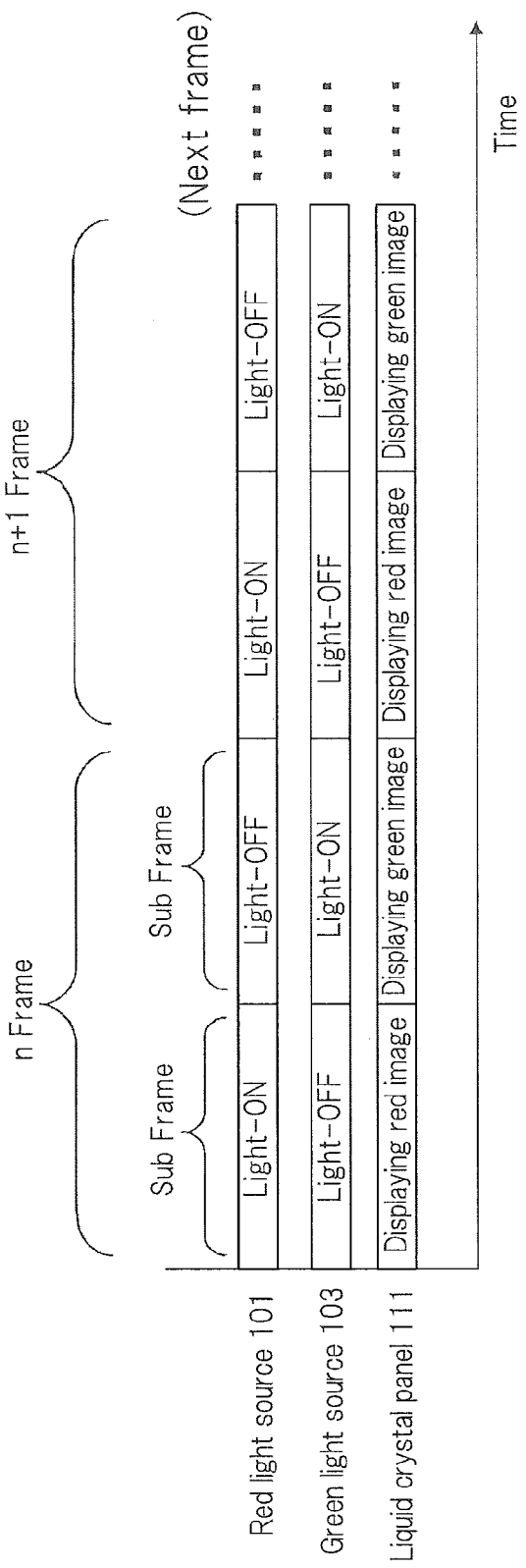
FIG. 10 An explanatory diagram showing the lighting timings of a green light source and a red light source by the control system of the projector shown in FIG. 8 and the driving timings of liquid crystal panels irradiated with lights from the light sources.

FIG. 10 shows the lighting timing of red light source 101 and green light source 103 and the driving timing of liquid crystal panel 111.

Referring to FIG. 10, one frame includes first and second subframes. In this example, the first and second subframes are equal in length. For example, a frame period is 60 Hz, and a subframe period is 120 Hz.

During the period of the first subframe, light source driving unit 201 sets red light source 101 in a light-ON state, and green light source 103 in a light-OFF state, and liquid crystal driving unit 203 displays an image based on a red video signal acquired from an input video signal on liquid crystal panel 111. In this case, a red image is displayed on liquid crystal panel 111.

During the period of the second subframe, light source driving unit 201 sets red light source 101 in a light-OFF state, and green light source 103 in a light-ON state, and liquid crystal driving unit 203 displays an image based on a green video signal acquired from an input video signal on liquid crystal panel 111. In this case, a green image is displayed on liquid crystal panel 111.

According to the operation shown in FIG. 10, the image based on the red video signal and the image based on the green video signal are displayed in time division on liquid crystal panel 111. During the display period of the image based on the red video signal on liquid crystal panel 111, only red light source 101 is lit. During the display period of the image based on the green video signal on liquid crystal panel 111, only green light source 103 is lit. Accordingly, the red image and the green image are alternately displayed for each subframe on liquid crystal panel 111.

Figure 11:
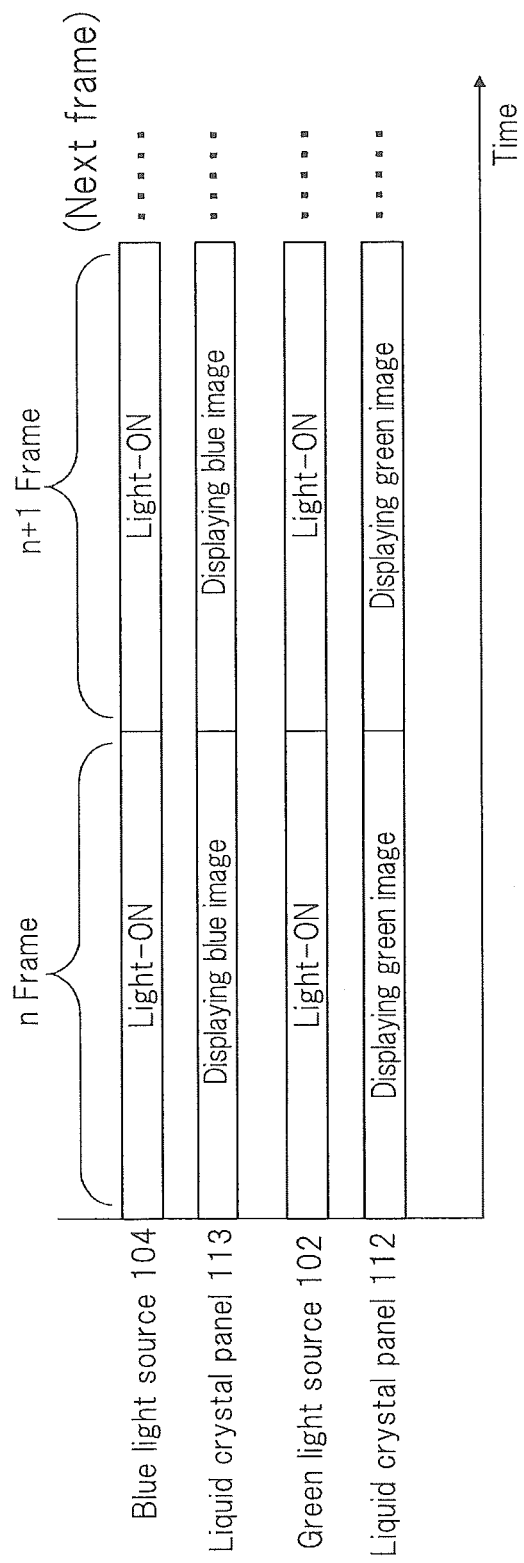
FIG. 11 An explanatory diagram showing the lighting timings of a blue light source and another green light source by the control system of the projector shown in FIG. 8 and the driving timings of liquid crystal panels irradiated with lights from the light sources.

FIG. 11 shows the lighting timing of green light source 102 and blue light source 102 and the driving timing of liquid crystal panels 112 and 113.

Referring to FIG. 11, during the period of one frame, light source driving unit 201 sets green light source 102 in a light-ON state, and liquid crystal driving unit 203 displays an image based on a green video signal acquired from an input video signal on liquid crystal panel 112. In this case, a green image is displayed on liquid crystal panel 112.

Similarly, during the period of one frame, light source driving unit 201 sets blue light source 104 in a light-ON state, and liquid crystal driving unit 203 displays an image based on a blue video signal acquired from an input video signal on liquid crystal panel 113. In this case, a blue image is displayed on liquid crystal panel 113.

According to an operation shown in FIG. 11, green light source 102 and blue light source 104 are both lit during the period of one frame, the green image based on the red video signal is displayed on liquid crystal panel 112, and the blue image based on the blue video signal is displayed on liquid crystal panel 113.

According to the embodiment, as shown in FIGS. 10 and 11, in the n-th frame of the input video signal, the red image and the green image acquired from the video signal of the n-th frame are displayed in time division on liquid crystal panel 111, the green image acquired from the video signal of the n-th frame is displayed on liquid crystal panel 112, and the blue image acquired from the video signal of the n-th frame is displayed on liquid crystal panel 113. In other words, the projected image in the n-th frame includes the red image and the green image displayed in time division on liquid crystal panel 111, the green image displayed on liquid crystal panel 112, and the blue image displayed on liquid crystal panel 113.

According to the projector of the embodiment, as in the case of the first embodiment, since green light source 103 equal in emission wavelength to green light source 102 is added, the amount of green light included in the projected light during the period of one frame is greater by about 1.5 times than that when only green light source 102 is driven for the period of one frame.

By using the amount of green light increased by 1.5 times as a reference, the amounts of light of red light source 101 and blue light source 104 are set to achieve optimal white balance.

In the aforementioned case, blue light source 104 is driven by current larger than that when only green light source 102 is driven by the rated current to achieve optimal white balance.

Red light source 101 is lit for the period of a subframe that is half of one frame. In this case, the amount of light of red light source 101 included in the projected image during the period of one frame is about half of that when red light source 101 is driven for the period of one frame. Accordingly, red light source 101 is driven by larger current (e.g., current twice as large as the rated current).

The driving current increase of red light source 101 and blue light source 104 is accompanied by increases in the amounts of red and blue lights included in the projected image during the period of one frame.

As described above, according to the lighting device of the embodiment, since the amounts of red, green, and blue lights included in the projected image during the period of one frame can be increased, the luminance of the projected image can be increased.

The ratio of amount of the respective color lights, i.e., red, green and blue, included in the projected image are set to achieve optimal white balance. Since the red image and the green image are displayed in time division on liquid crystal panel 111, the red image is not mixed with a green, thus preventing a reduction of red reproducibility in the projected image. Thus, since the image is displayed with the optimal white balance by using the light of high color purity included in each light source, a very bright image having high color reproducibility can be acquired.

Other effects are similar to those of the first embodiment.

All the modifications of the first embodiment can be applied to the projector of this embodiment.

Third Embodiment

Figure 12:
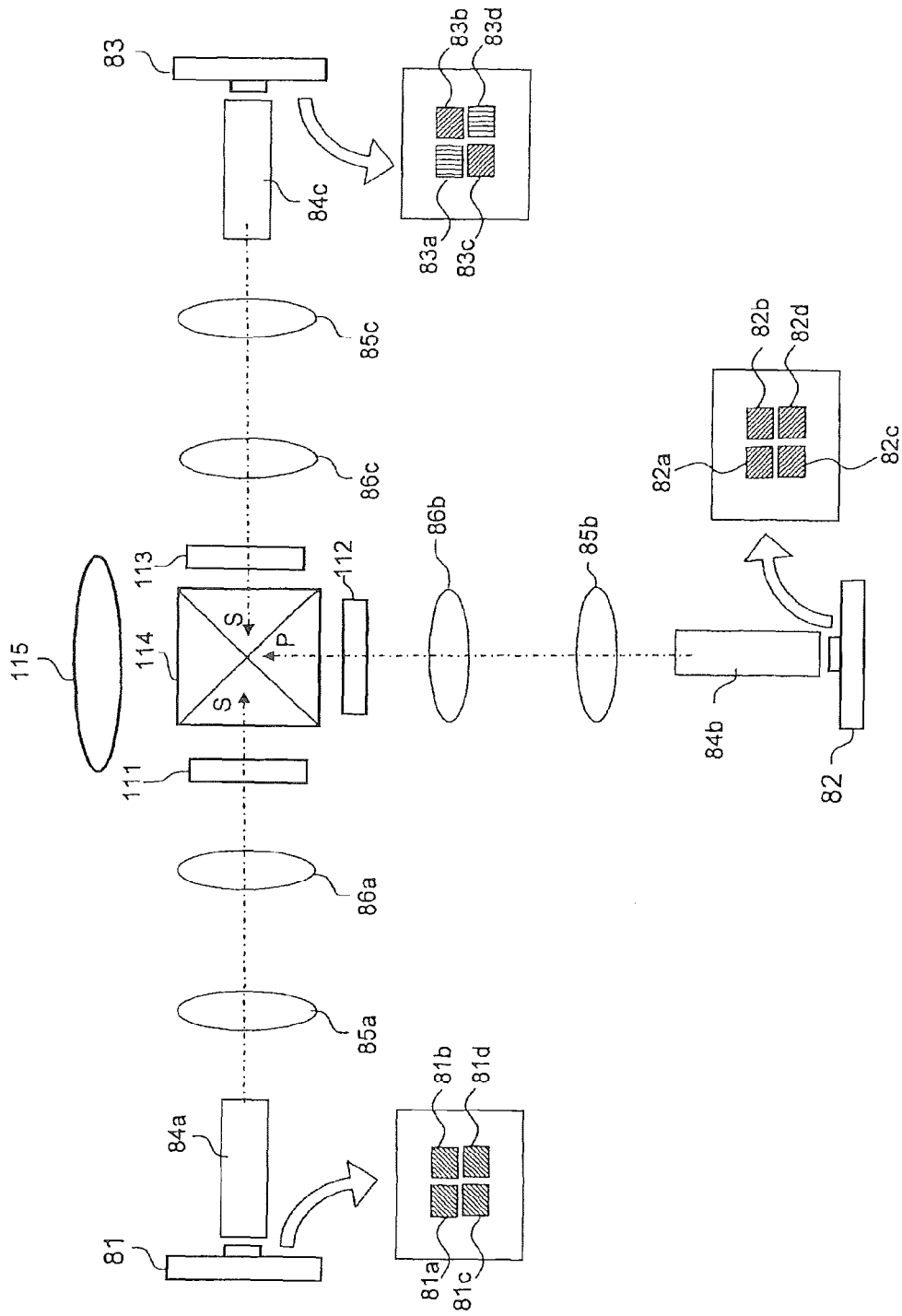
FIG. 12 A schematic diagram showing the configuration of a projector according to the third embodiment of the present invention.

FIG. 12 is a schematic diagram showing the configuration of a projector according to the third embodiment of the present invention.

The projector according to this embodiment includes light sources 81 to 83, optical guiding units 84a to 84c, illumination lenses 85a to 85c and 86a to 86c, liquid crystal panels 111 to 113, cross dichroic prism 114, and projection lens 115.

Liquid crystal panels 111 to 113, cross dichroic prism 114, and projection lens 115 are similar to those of the first embodiment.

Light sources 81 to 83 are multichip type solid light sources each including a plurality of semiconductor chips. As the multichip type solid light sources, there are a LED and a semiconductor laser.

Light source 81 includes four chips 81a to 81d. Chips 81a to 81d, which can be individually controlled, output red light (P-polarized light). The area of the entire emission surface (rectangular region shown in FIG. 12) of chips 81a to 81d is a maximum area within an area range satisfying the etendue restrictions.

Light source 82 includes four chips 82a to 82d. Chips 82a to 82d, which can be individually controlled, output green light (S-polarized light). The area of the entire emission surface (rectangular region shown in FIG. 12) of chips 82a to 82d is also a maximum area within the area range satisfying the etendue restrictions.

Light source 83 includes four chips 83a to 83d. Chips 83a to 83d, which can be individually controlled, output blue light (P-polarized light). Chips 83a to 83d, which can be individually controlled, output green light (P-polarized light). The area of the entire emission surface (rectangular region shown in FIG. 12) of chips 83a to 83d is a maximum area within the area range satisfying the restrictions of etendue.

Chips 81a to 81d are equal to one another in peak wavelength. Chips 82a to 82d and 83b and 83c are equal to one another in peak wavelength. Chips 83a and 83c are equal to each other in peak wavelength.

Optical guiding units 84a to 84c, which are all formed into rectangular solid shapes, function as rod integrators.

One end surface of optical guiding unit 84a faces a surface where chips 81a to 81d of light source 81 are formed. The size of one end surface of optical guiding unit 84a is roughly equal to that of the entire emission surface of chips 81a to 81d.

Red light output from chips 81a to 81d enters one end surface of optical guiding unit 84a. In optical guiding unit 84a, the red light from chips 81a top 81d is propagated inside to exit from the other end surface.

One end surface of optical guiding unit 84b faces a surface where chips 82a to 82d of light source 82 are formed. The size of one end surface of optical guiding unit 84b is roughly equal to that of the entire emission surface of chips 82a to 82d.

Green light output from chips 82a to 82d enters one end surface of optical guiding unit 84b. In optical guiding unit 84b, the green light from chips 82a top 82d is propagated inside to exit from the other end surface.

One end surface of optical guiding unit 84c faces a surface where chips 83a to 83d of light source 83 are formed. The size of one end surface of optical guiding unit 84c is roughly equal to that of the entire emission surface of chips 83a to 83d.

Blue light output from chips 83a and 83d and green light output from chips 83b and 83c enter one end surface of optical guiding unit 84c. In optical guiding unit 84c, the blue light output from chips 83a and 83d and the green light output from chips 83b and 83c are propagated inside to exit from the other end surface. In this case, optical guiding unit 84c outputs the blue light from chips 83a and 83d and the green light from chips 83b and 83c on the same optical path.

The red light (P-polarized light) output from the other end surface of optical guiding unit 84a is applied to liquid crystal panel 111 via illumination lenses 85a and 86a. A secondary rectangular light source having uniform luminance is formed at the other end surface (exit surface) of optical guiding surface 84a. Accordingly, uniform red light can be applied to liquid crystal panel 111.

The green light (S-polarized light) output from the other end surface of optical guiding unit 84b is applied to liquid crystal panel 112 via illumination lenses 85b and 86b. A secondary rectangular light source having uniform luminance is formed at the other end surface (exit surface) of optical guiding surface 84b. Accordingly, uniform green light can be applied to liquid crystal panel 111.

The green and blue lights (P-polarized lights) output from the other end surface of optical guiding unit 84c are applied to liquid crystal panel 113 via illumination lenses 85c and 86c. A secondary rectangular light source having uniform luminance is formed at the other end surface (exit surface) of optical guiding surface 84c. Accordingly, uniform green and blue lights can be applied to liquid crystal panel 111.

Next, the configuration of the control system of the projector according to the embodiment will be described.

The control system of the projector according to the embodiment is similar in configuration to the control system shown in FIG. 5. In FIG. 5, red light source 101 corresponds to chips 82a to 82d, green light source 102 corresponds to chips 82a to 82d, green light source 103 corresponds to chips 83b and 83c, and blue light source 104 corresponds to chips 83a and 83d.

The lighting control of light sources 81a to 83 by light source driving unit 201 and the driving control of liquid crystal panels 111 to 113 by liquid crystal driving unit 203 are as shown in FIGS. 6 and 7. However, in FIGS. 6 and 7, the lighting operation of red light source 101 is replaced with the lighting operation of chips 82a to 82d, the lighting operation of green light source 102 is replaced with the lighting operation of chips 82a to 82d, the lighting operation of green light source 103 is replaced with the lighting operation of chips 83b and 83c, and the lighting operation of blue light source 104 is replaced with the lighting operation of chips 83a and 83d.

The projector of this embodiment provides the same effects as those of the first embodiment.

In the projector of the embodiment, the green light from chops 83b and 83c and the blue light from chops 83a and 83 are synthesized not by the dichroic mirror but by optical guiding unit 84c. This simplifies the configuration to achieve a smaller number of components than that of the first embodiment.

All the modifications of the first embodiment can be applied to the projector of this embodiment.

In the embodiment, chips 81a to 81d of light source 81 and chips 83a to 83d of light source 83 each emit S-polarized lights, and chips 82a to 82d of light source 82 each emits P-polarized light. However, when these chips emit unpolarized lights, means such as polarization conversion element 108 capable of aligning polarized lights with one another must be provided in the optical path.

In the projector of the embodiment, chips 83b and 83c of light source 83 can be configured to emit blue light (P-polarized light), chips 81b and 81c of light source 81 can be configured to emit green light (P-polarized light), and cross dichroic 114 can be similar to that of the second embodiment. In this case, the operation of the second embodiment is carried out.

Further, in the projector of the embodiment, the number of chips of light sources 81 to 83 is not limited to four. The number of chips can be appropriately set within a range not exceeding a maximum area determined by the etendue restrictions.

The number of green chips to be added is not limited to two. The number of green chips to be added can be appropriately determined by taking into consideration conditions such as white balance or driving current supplied to the chips.

When lights from the plurality of light sources are synthesized by using the rod integrator, the area of the entire emission surface of each light source is within the range of a maximum area determined by the etendue restrictions. In other words, when the area of the entire emission surface of each light source exceeds the maximum area determined by the etendue restrictions, light use efficiency is reduced according to the extra area. Thus, in the configuration using the rod integrator, the number of light sources and the emission area are subject to the limitation of the restrictions of etendue.

In the embodiment, as shown in FIG. 12, the number of blue chips is reduced while the number of green chips is increased. This can increase the amount of green light while avoiding the etendue restrictions. The amount of blue light is reduced because of the smaller number of chips. However, when the ratio of the amount of light to achieve optimal white lance is set by using the amount of green light as a reference as described above, the light output performance of the blue light source still has a margin. Accordingly, by increasing driving current to use the margin as a light output, even when the number of blue chips is reduced, three primary colors can be synthesized with a desired color mixing ratio, and white light having high white balance can be acquired.

Fourth Embodiment

Figure 13:
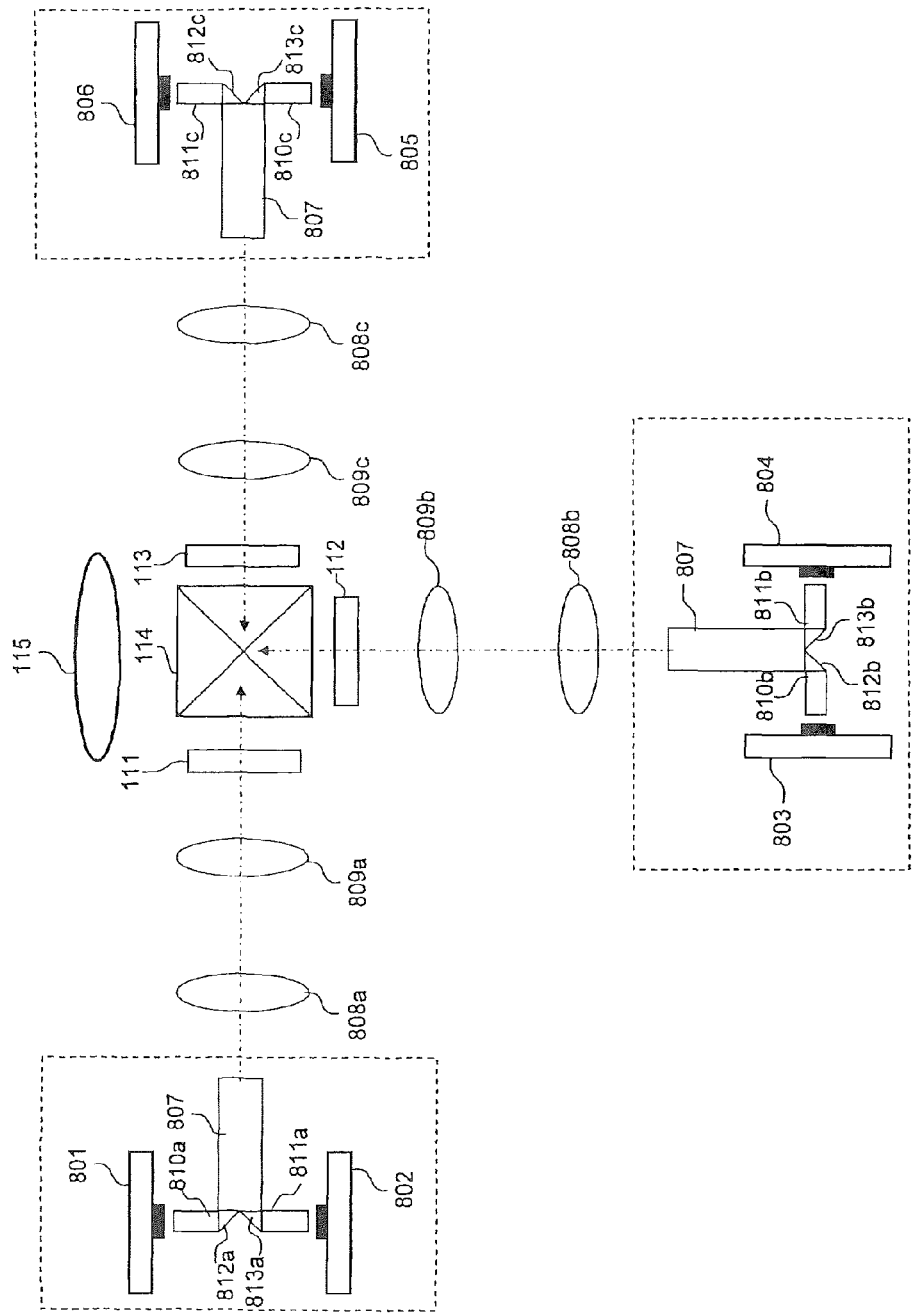
FIG. 13 A schematic diagram showing the configuration of a projector according to the fourth embodiment of the present invention.

FIG. 13 is a schematic diagram showing the configuration of a projector according to the fourth embodiment of the present invention.

The projector according to this embodiment includes light sources 91 to 93, illumination lenses 808a to 808c and 809a to 809c, liquid crystal panels 111 to 113, cross dichroic prism 114, and projection lens 115.

Liquid crystal panels 111 to 113, cross dichroic prism 114, and projection lens 115 are similar to those of the first embodiment.

Light source unit 91 includes red light sources 801 and 802, optical guiding units 807a, 810a, and 811a, and rectangular prisms 812a and 813a.

Red light sources 801 and 802 are solid light sources each having a peak wavelength in a red wavelength band, and including, for example, a LED or a semiconductor laser for emitting red light. The peak wavelengths of red light sources 801 and 802 are equal to each other.

Optical guiding units 807a, 810a, and 811a, which are all formed into rectangular solid shapes, function as rod integrators.

Rectangular prism 812a includes: first and second surfaces that are sides forming a right angle of a rectangular triangle; a slope that is an oblique side of the rectangular triangle; and first and second side surfaces which face each other, each side surface being orthogonal to the first and second surfaces and the slope. Rectangular prism 813a is similar in configuration to rectangular prism 812a.

One end surface of optical guiding unit 810a faces the emission surface of red light source 801. The size of one end surface of optical guiding unit 810a is roughly equal to that of the emission surface of red light source 801.

The other end surface of optical guiding unit 810a is bonded to the first surface of rectangular prism 812a. The size of the other end surface of optical guiding unit 810a is roughly equal to that of the first surface of rectangular prism 812a. The second surface of rectangular prism 812a is bonded to one end surface of optical guiding unit 807a.

One end surface of optical guiding unit 811a faces the emission surface of red light source 802. The size of one end surface of optical guiding unit 811a is roughly equal to that of the emission surface of red light source 802.

The other end surface of optical guiding unit 811a is bonded to the first surface of rectangular prism 813a. The size of the other end surface of optical guiding unit 811a is roughly equal to that of the first surface of rectangular prism 813a. The second surface of rectangular prism 813a is bonded to one end surface of optical guiding unit 807a.

The entire size of the second surface of rectangular prism 812a and the second surface of rectangular prism 813a is roughly equal to that of one end surface of optical guiding unit 807a.

Light source unit 92 includes green light sources 803 and 804, optical guiding units 807b, 810b, and 811b, and rectangular prisms 812a and 813a.

Green light sources 803 and 804 are solid light sources each having a peak wavelength in a green wavelength band, and including, for example, a LED or a semiconductor laser for emitting green light. The peak wavelengths of green light sources 803 and 804 are equal to each other.

Optical guiding units 807b, 810b, and 811b and rectangular prisms 812b and 813b are similar to optical guiding units 807a, 810a, and 811a and rectangular prisms 812a and 813a of light source 91. One end surface of optical guiding unit 810b faces the emission surface of green light source 803, and one end surface of optical guiding unit 810b faces the emission surface of green light source 804. The connection structure and the sizes of optical guiding units 807b, 810b, and 811b and rectangular prisms 812b and 813b are basically similar to those of light source 91.

Light source unit 93 includes green light source 805, blue light source 806, optical guiding units 807c, 810c, and 811c, and rectangular prisms 812c and 813c.

Green light source 805 is a solid light source having a peak wavelength in a green wavelength band, and including, for example, a LED or a semiconductor laser for emitting green light. The peak wavelength of green light source 805 is equal to those of green light sources 803 and 804.

Optical guiding units 807b, 810b, and 811b and rectangular prisms 812b and 813b are similar to optical guiding units 807a, 810a, and 811a and rectangular prisms 812a and 813a of light source 91. One end surface of optical guiding unit 810b faces the emission surface of green light source 803, and one end surface of optical guiding unit 810b faces the emission surface of green light source 804. The connection structure and the sizes of optical guiding units 807b, 810b, and 811b and rectangular prisms 812b and 813b are basically similar to those of light source 91.

In the embodiment, the red light (P-polarized light) emitted from red light source 801 is applied to liquid crystal panel 111 via optical guiding unit 810a, rectangular prism 812a, optical guiding unit 807a, and illumination lenses 808a and 809a. The red light (P-polarized light) emitted from red light source 802 is applied to liquid crystal panel 111 via optical guiding unit 811a, rectangular prism 813a, optical guiding unit 807a, and illumination lenses 808a and 809a. A secondary rectangular light source having uniform luminance is formed at the other end surface (exit surface) of optical guiding surface 807a. Accordingly, uniform red light can be applied to liquid crystal panel 111.

The green light (S-polarized light) emitted from green light source 803 is applied to liquid crystal panel 112 via optical guiding unit 810b, rectangular prism 812b, optical guiding unit 807b, and illumination lenses 808b and 809b. The green light (S-polarized light) emitted from green light source 804 is applied to liquid crystal panel 112 via optical guiding unit 811b, rectangular prism 813b, optical guiding unit 807b, and illumination lenses 808b and 809b. A secondary rectangular light source having uniform luminance is formed at the other end surface (exit surface) of optical guiding surface 807b. Accordingly, uniform green light can be applied to liquid crystal panel 112.

The green light (P-polarized light) emitted from green light source 805 is applied to liquid crystal panel 113 via optical guiding unit 810c, rectangular prism 812c, optical guiding unit 807c, and illumination lenses 808c and 809c. The green light (P-polarized light) emitted from blue light source 806 is applied to liquid crystal panel 113 via optical guiding unit 811c, rectangular prism 813c, optical guiding unit 807c, and illumination lenses 808c and 809c. A secondary rectangular light source having uniform luminance is formed at the other end surface (exit surface) of optical guiding surface 807c. Accordingly, uniform green and blue lights can be applied to liquid crystal panel 113.

Next, the configuration of the control system of the projector according to the embodiment will be described.

The control system of the projector according to the embodiment is similar in configuration to the control system shown in FIG. 5. In FIG. 5, red light source 101 corresponds to red light sources 801 and 802, green light source 102 corresponds to green light sources 803 and 804, green light source 103 corresponds to green light source 805, and blue light source 104 corresponds to blue light source 806.

The lighting control of light sources 91 to 93 by light source driving unit 201 and the driving control of liquid crystal panels 111 to 113 by liquid crystal driving unit 203 are as shown in FIGS. 6 and 7. However, in FIGS. 6 and 7, the lighting operation of red light source 101 is replaced with the lighting operation of red light sources 801 and 802, the lighting operation of green light source 102 is replaced with the lighting operation of green light sources 803 and 804, the lighting operation of green light source 103 is replaced with the lighting operation of green light source 805, and the lighting operation of blue light source 104 is replaced with the lighting operation of blue light source 806.

The projector of this embodiment provides the same effects as those of the third embodiment.

All the modifications of the first embodiment can be applied to the projector of this embodiment.

In the projector of this embodiment, red light source 802 and green light source 805 can be replaced, and cross dichroic 114 can be similar to that of the second embodiment. In this case, the operation of the second embodiment is carried out.

Further, in the projector of the embodiment, the number of light sources of each can be appropriately set within a range not exceeding a maximum area determined by the etendue restrictions. The number of green chips to be added is not limited to one. The number of green light sources to be added can be appropriately determined by taking into consideration conditions such as white balance or driving current supplied to the light sources.

Fifth Embodiment

Figure 14:
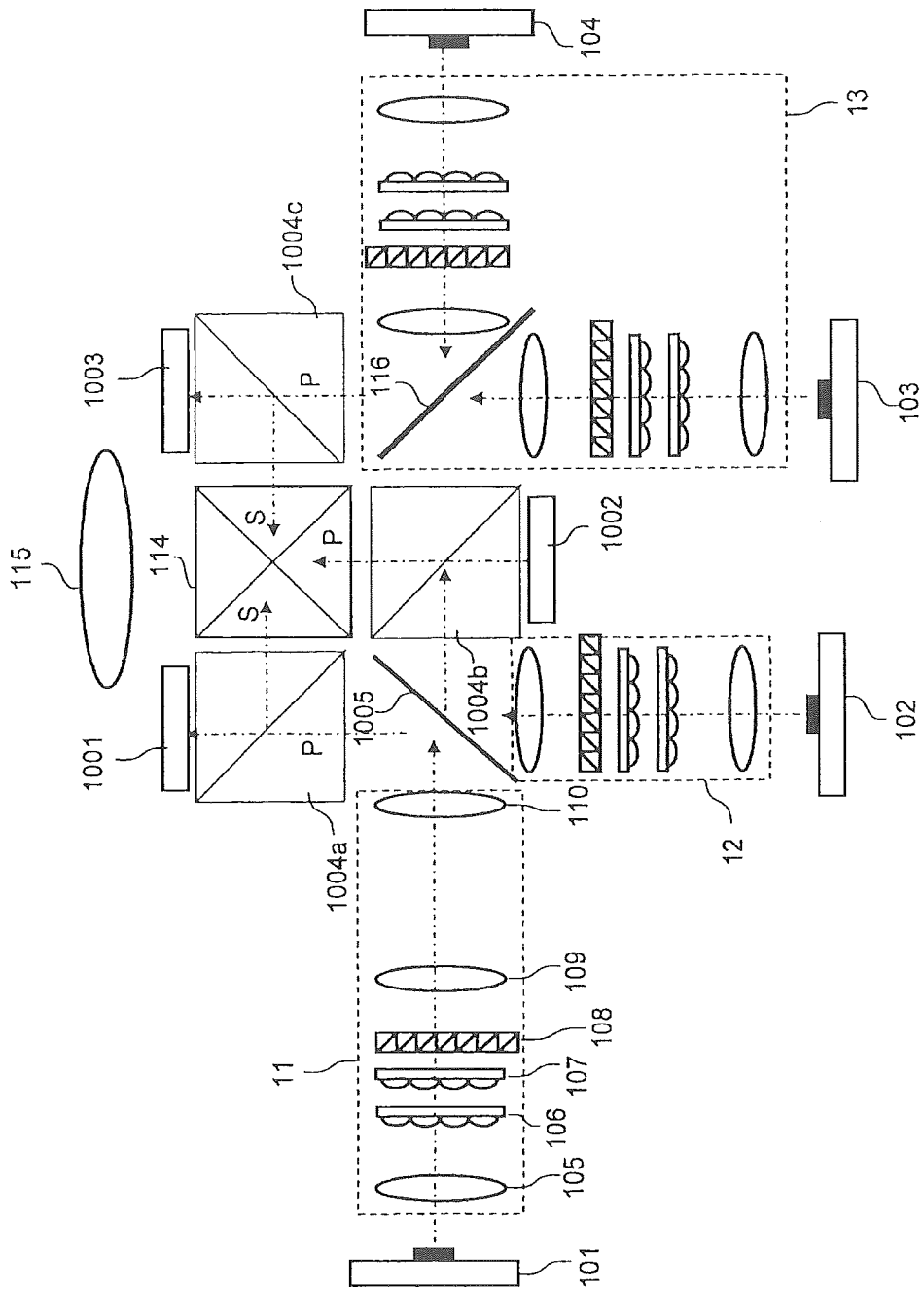
FIG. 14 A schematic diagram showing the configuration of a projector according to the fifth embodiment of the present invention.

FIG. 14 is a schematic diagram showing the configuration of a projector according to the fifth embodiment of the present invention.

The projector according to this embodiment includes red light source 101, green light sources 102 and 103, blue light source 104, lighting optical systems 11 to 13, LCOS 1001 to 1003, polarization beam splitters 1004a to 1004c, reflection mirror 1005, cross dichroic prism 114, and projection lens 115.

LCOS 1001 to 1003 are LCOS panels. Generally, a LCOS panel has characteristics of reflecting light and maintaining a polarized state when no voltage is applied to a pixel electrode, and reflecting the light and rotating a polarizing axis due to the λ/4 phase difference of a liquid crystal when a voltage is applied to the pixel electrode.

Red light source 101, green light source 102, blue light source 104, cross dichroic prism 114, and projection lens 115 are similar to those of the first embodiment. Lighting optical systems 11 to 13 are basically similar to those of the first embodiment, but are different as regards characteristics of the polarization separation film of polarization conversion element 108. In the embodiment, in lighting optical systems 11 and 13, polarization conversion element 108 is configured to emit P-polarized light. In lighting optical system 12, polarization conversion element 108 is configured to emit S-polarized light.

The optical axis of lighting optical system 11 is orthogonal to that of lighting optical system 12, and reflection mirror 1005 is located at the intersection of the optical axes. Total reflection films are formed on both surfaces of reflection mirror 1005.

The red light (P-polarized light) from lighting optical system 11 enters into one total reflection surface of reflection mirror 1005 at an incident angle of about 45°. Polarization beam splitter 1004a is disposed in the traveling direction of the red light (P-polarized light) reflected on one total reflection surface of reflection mirror 1005.

Polarization beam splitter 1004a, which includes a polarization separation film having characteristics of reflecting S-polarized light while transmitting P-polarized light, is configured so that green light (S-polarized light) from reflection mirror 1005 can enter the film surface of the polarization separation film at an incident angle of about 45°. Red light (S-polarized light) from reflection mirror 1005 is reflected by polarization beam splitter 1004a.

LCOS 1001 is disposed in the traveling direction of the red light (P-polarized light) transmitted through polarization beam splitter 1004a. The red light (P-polarized light) from polarization beam splitter 1004a enters roughly vertically to the substrate surface (surface of transparent substrate side) of LCOS 1001.

LCOS 1001 reflects the red light (P-polarized light) from polarization beam splitter 1004a toward polarization beam splitter 1004a side. The polarized state of the reflected light changes according to the state of voltage applied to the pixel electrode. Of the reflected light from LCOS 1001, the red light of P-polarized light is transmitted through polarization beam splitter 1004a, while the red light of S-polarized light is reflected by polarization beam splitter 1004a.

Cross dichroic prism 114 is disposed in the traveling direction of the red light of S-polarized light transmitted through polarization beam splitter 1004a.

The green light (S-polarized light) from lighting optical system 12 enters the other total reflection surface of reflection mirror 1005 at an incident angle of about 45°. Polarization beam splitter 1004b is disposed in the traveling direction of the green light (S-polarized light) reflected on the other total reflection surface of reflection mirror 1005.

Polarization beam splitter 1004b, which includes a polarization separation film having characteristics of reflecting S-polarized light while transmitting P-polarized light, is configured so that green light (S-polarized light) from reflection mirror 1005 can enter the film surface of the polarization separation film at an incident angle of about 45°. Green light (S-polarized light) from reflection mirror 1005 is reflected by polarization beam splitter 1004b.

LCOS 1002 is disposed in the traveling direction of the green light (S-polarized light) reflected by polarization beam splitter 1004b. The green light (S-polarized light) from polarization beam splitter 1004b enters roughly vertically to the substrate surface (surface of transparent substrate side) of LCOS 1002.

LCOS 1002 reflects the green light (S-polarized light) from polarization beam splitter 1004b toward polarization beam splitter 1004b side. The polarized state of the reflected light changes according to the applied state of a voltage to the pixel electrode. Of the reflected light from LCOS 1002, the green light of S-polarized light is reflected by polarization beam splitter 1004b, while the green light of P-polarized light is transmitted through polarization beam splitter 1004b.

Cross dichroic prism 114 is disposed in the traveling direction of the red light of P-polarized light transmitted through polarization beam splitter 1004b.

Polarization beam splitter 1004c is disposed in the traveling direction of the green or blue light (P-polarized light) emitted from lighting optical system 13. Polarization beam splitter 1004c, which includes a polarization separation film having characteristics of transmitting P-polarized light while reflecting S-polarized light, is configured so that green or blue light (P-polarized light) from lighting optical system 13 can enter the film surface of the polarization separation film at an incident angle of about 45°. The green or blue light (P-polarized light) from lighting optical system 13 is transmitted through polarization beam splitter 1004c.

LCOS 1003 is disposed in the traveling direction of the green or blue light (P-polarized light) reflected by polarization beam splitter 1004c. The green or blue light (P-polarized light) from polarization beam splitter 1004c enters roughly vertically to the substrate surface (surface of transparent substrate side) of LCOS 1003.

LCOS 1003 reflects the green or blue light (P-polarized light) from polarization beam splitter 1004c toward polarization beam splitter 1004c side. The polarized state of the reflected light changes according to the state of a voltage applied to the pixel electrode. Of the reflected light from LCOS 1003, the green or blue light of P-polarized light is transmitted through polarization beam splitter 1004c, while the green or blue light of S-polarized light is reflected by polarization beam splitter 1004c.

Cross dichroic prism 114 is disposed in the traveling direction of the green or blue light of S-polarized light reflected by polarization beam splitter 1004c.

Cross dichroic prism 114 color-synthesizes the red image displayed in LCOS 1001, the green image displayed in LCOS 1002, and the green image and the blue image displayed in time division in LCOS 1003.

Next, the configuration of the control system of the projector according to the embodiment will be described.

The control system of the projector according to the embodiment is similar in configuration to the control system shown in FIG. 5. In FIG. 5, liquid crystal panel 111 corresponds to LCOS 1001, liquid crystal panel 112 corresponds to LCOS 1002, and liquid crystal panel 113 corresponds to LCOS 1003.

The lighting control of light sources 91 to 93 by light source driving unit 201 and the driving control of liquid crystal panels 111 to 113 by liquid crystal driving unit 203 are as shown in FIGS. 6 and 7.

The projector of this embodiment provides the same effects as those of the third embodiment.

All the modifications of the first embodiment can be applied to the projector of this embodiment.

The projector according to each of the embodiments is only an example of the present invention, and changes of the configuration and the operation thereof understandable to those skilled in the art can be made without departing from the spirit and the scope of the invention.

For example, in the projector shown in FIG. 1, as red light source 101, green light sources 102 and 103, and blue light source 104, light sources using phosphors for emitting fluorescence can be used.

Figure 15:
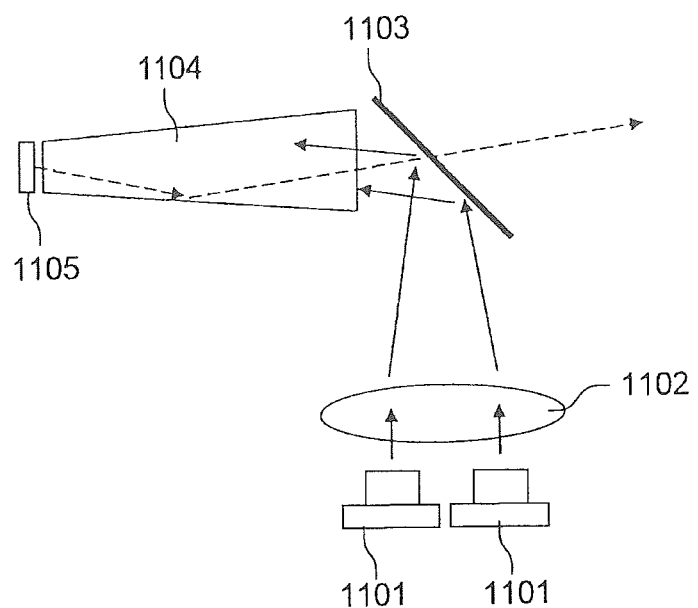
FIG. 15 A schematic diagram showing an example of a light source using a phosphor.

FIG. 15 shows an example of a green light source using a phosphor.

Referring to FIG. 15, the green light source includes excitation lasers 1101 and 1102, condenser lens 1102, dichroic mirror 1103, rod integrator 1104, and phosphor 1105.

The optical axes of excitation lasers 1101 and 1102 are parallel to each other. The wavelengths of excitation lights emitted from excitation lasers 1101 and 1102 are equal to each other, and smaller than the wavelength of fluorescence emitted from phosphor 1105. In this example, since the color of the fluorescence emitted from phosphor 1105 is green, the excitation lights output from excitation lasers 1101 and 1102 are blue lights or ultraviolet lights.

Dichroic mirror 1103 is located in the traveling direction of the excitation lights output from excitation lasers 1101 and 1102. Dichroic mirror 1103 has characteristics of transmitting the fluorescence emitted from phosphor 1105 while reflecting the excitation lights output from excitation lasers 1101 and 1102. The excitation lights output from excitation lasers 1101 and 1102 are reflected by dichroic mirror 1103.

Rod integrator 1104 is formed into a roughly rectangular solid shape so that its section can be gradually larger from one end surface side to the other end surface side. The excitation lights reflected by dichroic mirror 1103 enter into the other end surface of rod integrator 1104. In rod integrator 1104, the excitation lights that enter from the other end surface are repeatedly reflected to be propagated inside, and exit from one end surface.

Phosphor 1105 is located to face one end surface of rod integrator 1104. The excitation light output from one end surface of rod integrator 1104 is applied to phosphor 1105.

Phosphor 1105 is excited by the excitation light from one end surface of rod integrator 1104 to emit green fluorescence. The green fluorescence (diffused light) emitted from phosphor 1105 enters one end surface of rod integrator 1104. In rod integrator 1104, the green fluorescence that entered from one end surface is repeatedly reflected to be propagated inside, and exits from the other end surface.

The green fluorescence output from the other end surface of rod integrator 1104 is transmitted through dichroic mirror 1103. The green fluorescence transmitted through dichroic mirror 1103 is output light of the green light source.

In the configuration shown in FIG. 15, a red light source or a blue light source can be realized by using phosphor 1105 for emitting red or blue fluorescence.

In the second to fifth embodiments, the light source using the phosphor shown in FIG. 15 can be applied to each color light source.

Other Embodiments

A projector according to another embodiment of the present invention includes first to third display elements each of which spatially modulates incident light to display an image, a first light source unit that includes a red light source for emitting red light having a peak wavelength in a red wavelength band, the red light emitted from the red light source being applied to the first display element, a second light source unit that includes a first green light source for emitting first green light having a peak wavelength in a green wavelength band, the first green light emitted from the first green light source being applied to the second display element, a third light source unit that includes a second green light source for emitting second green light having a peak wavelength in the green wavelength band and a blue light source for emitting blue light having a peak wavelength in a blue wavelength band, the second green light emitted from the second green light source and the blue light emitted from the blue light source being applied on the same optical path to the third display element, color synthesizing means for synthesizing the images displayed by the first to third display elements, a projection lens for projecting the image synthesized by the color synthesizing means, and control means for controlling, based on an input video signal, display operations of the first to third display elements and lighting operations of the red light source, the first and second green light sources, and the blue light source in synchronization.

The control means lights the red light source to display a red image based on the input video signal by the first display element, lights the first green light source to display a green image based on the input video signal by the second display element, and alternately lights the second green light source and the blue light source to display the green image and a blue image based on the input video signal in time division by the third display element.

Specifically, the control means lights, for a predetermined period, the red light source and the first green light source to respectively display the red image and the green image by the first and second display elements, and lights, for a first period, the second green light source to display the green image by the third display element, and lights, for a second period, the blue light source to display the blue image by the third display element, the first and second periods being provided by dividing the predetermined period with a predetermined ratio.

In the projector according to another embodiment of the present invention, the control means corresponds to the control system including light source driving unit 201, control unit 202, and liquid crystal driving unit 203 shown in FIG. 5. The predetermined period corresponds to, for example, a frame period.

To take the example of the first embodiment, the first light source unit corresponds to the portion of red light source 101 and lighting optical system 11, and the second light source unit corresponds to the portion of green light source 102 and lighting optical system 12. The third light source unit corresponds to the portion of green light source 103, blue light source 104, and lighting optical system 13. The first to third display elements correspond to liquid crystal panels 111 to 113. The color synthesizing means corresponds to cross dichroic prism 114.

Correspondence similar to the foregoing applies to the third to fifth embodiments.

According to the projector of another embodiment of the present invention, the second green light emitted from the second green light source and the blue light emitted from the blue light source are synthesized. In this case, the difference in peak wavelength between the second green light and the blue light is sufficiently larger than that in the emission wavelength between the first and second green LEDs described in Patent Literature 1. Thus, by setting the peak wavelengths of the first and second green lights roughly equal to each other, and synthesizing the second green light and the blue light by, for example, by using the dichroic mirror, the problem in which a certain amount of light is reduced in the dichroic mirror can be prevented.

Setting the peak wavelengths of the first and second green lights roughly equal to each other enables an increase in the color purity of the green included in the projected image. Thus, a projected image having high color reproducibility can be acquired.

Further, according to the configuration where the second green light and the blue light are applied to the third display element on the same optical path, most of the second green light and the blue light can be used as a projected image. Thus, reduction of light use efficiency caused by the etendue restrictions can be prevented.

In the projector according to another embodiment, the third light source unit can include a dichroic mirror for synthesizing the green light from the second green light source and the blue light from the blue light source.

The third light source unit can include an optical element for synthesizing the green light from the second green light source and the blue light from the blue light source.

Further, the red light source, the first and second green lights, and the blue light source can include semiconductor chips, and the semiconductor chip of the second green light source and the semiconductor chip of the blue light source can be arranged on the same substrate.

A projector according to yet another embodiment of the present invention includes first to third display elements each of which spatially modulates incident light to display an image, a first light source unit that includes a blue light source for emitting blue light having a peak wavelength in a blue wavelength band, the blue light emitted from the blue light source being applied to the first display element, a second light source unit that includes a first green light source for emitting first green light having a peak wavelength in a green wavelength band, the first green light emitted from the first green light source being applied to the second display element, a third light source unit that includes a second green light source for emitting second green light having a peak wavelength in the green wavelength band and a red light source for emitting red light having a peak wavelength in a red wavelength band, the second green light emitted from the second green light source and the red light emitted from the red light source being applied on the same optical path to the third display element, color synthesizing means for synthesizing the images displayed by the first to third display elements, a projection lens for projecting the image synthesized by the color synthesizing means, and control means for controlling, based on an input video signal, display operations of the first to third display elements and lighting operations of the red light source, the first and second green light sources, and the blue light source in synchronization.

The control means lights the blue light source to display a blue image based on the input video signal by the first display element, lights the first green light source to display a green image based on the input video signal by the second display element, and alternately lights the second green light source and the red light source to display the green image and a red image based on the input video signal in time division by the third display element.

Specifically, the control means lights, for a predetermined period, the blue light source and the first green light source to respectively display the blue image and the green image by the first and second display elements, and lights, for a first period, the second green light source to display the green image by the third display element, and lights, for a second period, the red light source to display the red image by the third display element, the first and second periods being provided by dividing the predetermined period with a predetermined ratio.

In the projector according to yet another embodiment of the present invention, the control means corresponds to the control system including light source driving unit 201, control unit 202, and liquid crystal driving unit 203 shown in FIG. 5. The predetermined period corresponds to, for example, a frame period.

To take the example of the second embodiment, the first light source unit corresponds to the portion of red light source 101, green light source 103, and lighting optical system 71, and the second light source unit corresponds to the portion of green light source 102 and lighting optical system 72. The third light source unit corresponds to the portion of blue light source 104 and lighting optical system 13. The first to third display elements correspond to liquid crystal panels 111 to 113. The color synthesizing means corresponds to cross dichroic prism 114.

According to the projector of yet another embodiment of the present invention, the second green light emitted from the second green light source and the red light emitted from the red light source are synthesized. In this case, the difference in peak wavelength between the second green light and the red light is sufficiently larger than that in the emission wavelength between the first and second green LEDs described in Patent Literature 1. Thus, by setting the peak wavelengths of the first and second green lights roughly equal to each other, and synthesizing the second green light and the red light, for example, by using the dichroic mirror, the problem in which a certain amount of light is reduced in the dichroic mirror can be prevented.

Setting the peak wavelengths of the first and second green lights roughly equal to each other enables an increase in the color purity of the green included in the projected image. Thus, a projected image having high color reproducibility can be acquired.

Further, according to the configuration where the second green light and the red light are applied to the third display element on the same optical path, most of the second green light and the red light can be used as a projected image. Thus, reduction of light use efficiency caused by the etendue restrictions can be prevented.

In the projector according to yet another embodiment, the third light source unit can include a dichroic mirror for synthesizing the green light from the second green light source and the red light from the red light source.

The third light source unit can include an optical element for synthesizing the green light from the second green light source and the red light from the red light source.

Further, the red light source, the first and second green lights, and the blue light source can include semiconductor chips, and the semiconductor chip of the second green light source and the semiconductor chip of the red light source can be arranged on the same substrate.

In the projector according to another embodiment and the projector according to yet another embodiment, the red light source, the first and second green light sources, and the blue light source can be solid light sources.

The invention claimed is:

1. An image display method implemented in a projector that includes first to third display elements each of which spatially modulates incident light to display an image, synthesizes the images displayed by the first to third display elements, and projects the synthesized image, the method comprising:
irradiating, for a predetermined period, the first display element with red light having a peak wavelength in a red wavelength band such that the first display element displays a red image based on an input video signal;
irradiating, for the predetermined period, the second display element with first green light having a peak wavelength in a green wavelength band such that the second display element displays a green image based on the input video signal; and irradiating, for a first period, the third display element with second green light having a peak wavelength in the green wavelength band such that the third display element displays the green image, and irradiating, for a second period, the third display element with blue light having a peak wavelength in a blue wavelength band on the same optical path as that of the second green light such that the third display element displays a blue image based on the input video signal, the first and second periods being provided by dividing the predetermined period with a predetermined ratio, wherein the peak wavelength of said first green light is equal to that of said second green light.

2. An image display method implemented in a projector that includes first to third display elements each of which spatially modulates incident light to display an image, synthesizes the images displayed by the first to third display elements, and projects the synthesized image, the method comprising:

irradiating, for a predetermined period, the first display element with blue light having a peak wavelength in a blue wavelength band such that the first display element displays a blue image based on an input video signal;

irradiating, for the predetermined period, the second display element with first green light having a peak wavelength in a green wavelength band such that the second display element displays a green image based on the input video signal; and irradiating, for a first period, the third display element with second green light having a peak wavelength in the green wavelength band such that the third display element displays the green image, and irradiating, for a second period, the third display element with red light having a peak wavelength in a red wavelength band on the same optical path as that of the second green light such that the third display element displays a red image based on the input video signal, the first and second periods being provided by dividing the predetermined period with a predetermined ratio, wherein the peak wavelength of said first green light is equal to that of said second green light.

3. An image display method implemented in a projector that includes first to third display elements each of which spatially modulates incident light to display an image, synthesizes the images displayed by the first to third display elements, and projects the synthesized image, the method comprising:

irradiating, for a predetermined period, the first display element with a first light having a peak wavelength in a first wavelength band such that the first display element displays a first image based on an input video signal by the first display element;

irradiating, for the predetermined period, the second display element with second light having a peak wavelength in a second wavelength band such that the second display element displays a second image based on the input video signal by the second display element; and irradiating, for a first period, the third display element with a third light having a peak wavelength in the second wavelength band such that the third display element displays the second image by the third display element, and irradiating, for a second period, the third display element with a fourth light having a peak wavelength in a fourth wavelength band on the same optical path as that of the third light such that the third display element displays a fourth image based on the input video signal by the third display element, the first and second periods being provided by dividing the predetermined period with a predetermined ratio, wherein the peak wavelength of said second light is equal to that of said third light.

4. The image display method according to claim 1, wherein the first and second periods are equal.

5. The image display method according to claim 2, wherein the first and second periods are equal.

6. The image display method according to claim 3, wherein the first and second periods are equal.

7. The image display method according to claim 1, wherein the irradiating irradiates the third display element with the second green light for half of the predetermined period.

8. The image display method according to claim 2, wherein the irradiating irradiates the third display element with the second green light for half of the predetermined period.

9. The image display method according to claim 3, wherein the irradiating irradiates the third display element with the third light for half of the predetermined period.

10. The image display method according to claim 1, wherein the first period is half of the predetermined period.

11. The image display method according to claim 2, wherein the first period is half of the predetermined period.

12. The image display method according to claim 3, wherein the first period is half of the predetermined period.

13. The image display method according to claim 1, wherein the predetermined ratio is set according to a white balance output.

14. The image display method according to claim 2, wherein the predetermined ratio is set according to a white balance output.

15. The image display method according to claim 3, wherein the predetermined ratio is set according to a white balance output.

16. The image display method according to claim 1, wherein an equality of the peak wavelengths of said first green light and said second green light include a first case where the peak wavelengths match each other and a second case where the peak wavelengths are within a manufacturing variance range.

17. The image display method according to claim 2, wherein an equality of the peak wavelengths of said first green light and said second green light include a first case where the peak wavelengths match each other and a second case where the peak wavelengths are within a manufacturing variance range.

18. The image display method according to claim 3, wherein an equality of the peak wavelengths of said first green light and said second green light include a first case where the peak wavelengths match each other and a second case where the peak wavelengths are within a manufacturing variance range.

* * * * *